United States Patent

Tsotsis

(10) Patent No.: US 9,683,310 B2
(45) Date of Patent: Jun. 20, 2017

(54) HOLLOW FIBER WITH GRADIENT PROPERTIES AND METHOD OF MAKING THE SAME

(75) Inventor: Thomas Karl Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 13/316,506

(22) Filed: Dec. 10, 2011

(65) Prior Publication Data

US 2013/0149523 A1 Jun. 13, 2013

(51) Int. Cl.
| | |
|---|---|
| *B32B 5/02* | (2006.01) |
| *D01F 8/04* | (2006.01) |
| *D01D 5/34* | (2006.01) |
| *D01D 5/24* | (2006.01) |
| *D01F 1/10* | (2006.01) |
| *D01F 9/14* | (2006.01) |

(52) U.S. Cl.
CPC ............. *D01D 5/24* (2013.01); *D01D 5/34* (2013.01); *D01F 1/10* (2013.01); *D01F 9/14* (2013.01); *Y10T 428/24994* (2015.04); *Y10T 428/2975* (2015.01)

(58) Field of Classification Search
CPC ..... D01F 1/00; D01F 8/00; D01F 1/09; D01F 8/04; Y10T 428/2929; Y10T 428/24994; Y10T 428/2916; Y10T 428/2918; Y10T 442/3154
USPC ............... 428/373, 296.7, 297.4, 366, 367; 442/220, 364; 977/742
See application file for complete search history.

(56) References Cited

U.S. PATENT DOCUMENTS

| 3,677,705 A | 7/1972 | Ram et al. |
| 4,208,267 A | 6/1980 | Diefendorf et al. |

(Continued)

FOREIGN PATENT DOCUMENTS

| CN | 101768791 A | 7/2010 |
| EP | 1935480 A1 | 6/2008 |

(Continued)

OTHER PUBLICATIONS

Kumar, Satish, Functional Polymer—Polymer/Carbon Nanotube Bi-Component Fibers, Nov. 2010, National Textile Center Annual Report, pp. 1-10.*
Su, Minglue, et al., "Effect of Inner-Layer Thermal Conductivity on Flux Enhancement of Dual-Layer Hollow Fiber Membranes in Direct Contact Membrane Distillation", Journal of Membrane Science, Elsevier Scientific Publ. Company, Amsterdam, NL, vol. 364, No. 1-2, Nov. 15, 2010, pp. 278-289.

(Continued)

*Primary Examiner* — Camie Thompson

(57) ABSTRACT

There is provided a hollow fiber and method of making. The hollow fiber has an inner-volume portion having a first-core portion and one or more hollow second-core portions. The first-core portion has nanostructures and one or more first polymers. The nanostructures act as an orientation template for orientation of the first polymers in a direction parallel to a longitudinal axis of the fiber. The first-core portion is in contact with and encompasses the hollow second-core portions. The hollow fiber further has an outer-volume portion having one or more second polymers. The outer-volume portion is in contact with and completely encompasses the inner-volume portion. The inner-volume portion has at least one of a tensile modulus and a strength that are higher than at least one of a tensile modulus and a strength of the outer-volume portion.

19 Claims, 10 Drawing Sheets

(56) References Cited

U.S. PATENT DOCUMENTS

| | | | |
|---|---|---|---|
| 4,277,324 A | | 7/1981 | Greenwood |
| 5,021,497 A | | 6/1991 | Ohara et al. |
| 5,032,250 A | | 7/1991 | Romine et al. |
| 5,156,831 A | | 10/1992 | Fain et al. |
| 5,338,605 A | | 8/1994 | Noland et al. |
| 5,602,222 A | | 2/1997 | Smierciak et al. |
| 5,618,901 A | | 4/1997 | Smierciak et al. |
| 5,821,012 A | * | 10/1998 | McCullough .............. 429/209 |
| 5,902,530 A | | 5/1999 | Jorkasky et al. |
| 6,852,410 B2 | * | 2/2005 | Veedu .................. D01F 1/09 428/367 |
| 7,273,652 B2 | | 9/2007 | Takeda et al. |
| 7,875,801 B2 | | 1/2011 | Tsotsis |
| 7,875,802 B2 | | 1/2011 | Tsotsis |
| 7,897,876 B2 | | 3/2011 | Tsotsis et al. |
| 7,938,996 B2 | | 5/2011 | Baughman et al. |
| 8,043,520 B2 | | 10/2011 | Asakawa et al. |
| 2005/0100501 A1 | | 5/2005 | Veedu et al. |
| 2008/0286564 A1 | | 11/2008 | Tsotsis |
| 2010/0120969 A1 | * | 5/2010 | Tsotsis ..................... 524/496 |
| 2010/0173105 A1 | | 7/2010 | Tsotsis et al. |
| 2010/0272978 A1 | * | 10/2010 | Kumar .................. D01F 1/10 428/220 |
| 2011/0262730 A1 | | 10/2011 | Tsotsis |
| 2012/0244333 A1 | * | 9/2012 | Aksay .................. D01F 1/09 428/221 |

FOREIGN PATENT DOCUMENTS

| | | | | |
|---|---|---|---|---|
| JP | 10088430 A | * | 4/1998 | .............. D01F 9/14 |
| JP | 2006137869 A | | 6/2006 | |
| JP | 2007092234 A | | 4/2007 | |
| JP | 2009185425 A | | 8/2009 | |
| WO | 03076703 A1 | | 9/2003 | |
| WO | 2007103422 A1 | | 9/2007 | |
| WO | 2009049174 A1 | | 4/2009 | |
| WO | WO 2009049174 A1 | * | 4/2009 | .............. H01B 1/24 |
| WO | WO2009049174 A1 | | 4/2009 | |
| WO | WO2010136729 A1 | | 12/2010 | |

OTHER PUBLICATIONS

Extended European Search Report, European Patent Office, Dated Apr. 10, 2013, for EP Application No. 12194048.0, The Boeing Company, 8 pages.

PCT Notification Concerning Transmittal of International Preliminary Report on Patentability and Written Opinion of the International Searching Authority for Counterpart International Application No. PCT/US2012/061480, Mailed Jun. 19, 2014, Applicant The Boeing Company, 11 pages.

Chae et al., "Stabilization and Carbonization of Gel Spun Polyacrylonitrile/Single Wall Carbon Nanotube Composite Fibers", Polymer, vol. 48, No. 13, Jun. 5, 2007, pp. 3781-3789, XP022105811.

Min et al., "Polymer/carbon nanotube composite fibers—An overview", Functional Composites of Carbon Nanotubes and Applications, 2009, Transworld Research Network, Trivandrum, Kerala, India, XP055050925, ISBN:978-8-17-895413-4, pp. 43-73.

State Intellectual Property Office (SIPO) of the P.R.C., Notification of First Office Action and Search Report, Issued Dec. 25, 2015, for related Chinese Application No. 201210530067.7, The Boeing Company, 17 pages.

European Patent Office (EPO) Examination Report for Counterpart EP Application No. 12194048.0, Mailed Jun. 18, 2015, Applicant The Boeing Company, 5 pages.

Japanese Patent Office Notice of Reasons for Rejection (English Version and Japanese Version), Issued Sep. 20, 2016, for counterpart Japanese Application No. 2012-268032, The Boeing Company, 6 pages.

State Intellectual Property Office (SIPO) of the P.R.C., Notification of Second Office Action and Search Report (Chinese Version and English Version), Issued Aug. 10, 2016, for related Chinese Application No. 201210530067.7, The Boeing Company, 13 pages.

Yuris A. Dzenis, "Spinning Continuous Fibers for Nanotechnology", Faculty Publications from the Department of Engineering Mechanics of the University of Nebraska, 2004, 4 pages.

Japanese Patent Office Notice of Reasons for Rejection Final Action (English Version and Japanese Version), Issued Jan. 17, 2017, for counterpart Japanese Application No. 2012-268032, The Boeing Company, 5 total pages.

* cited by examiner

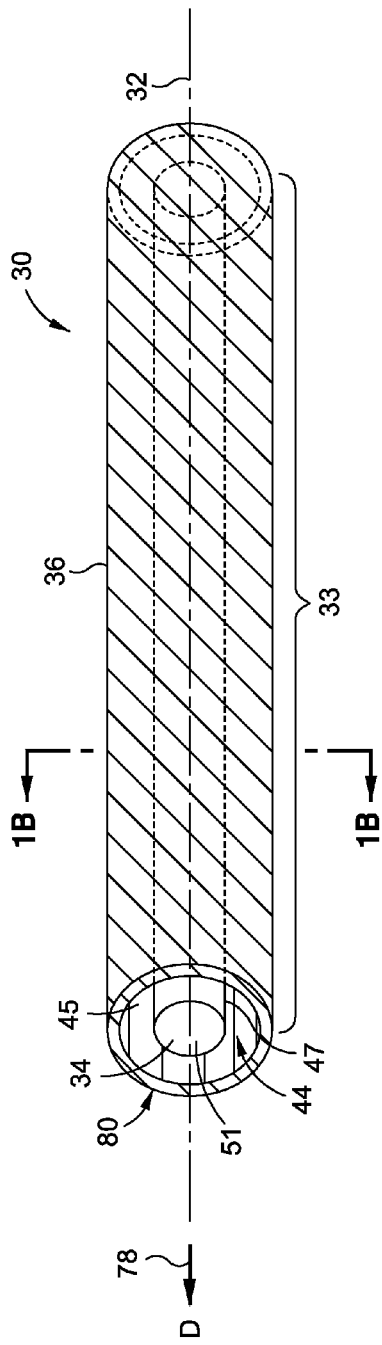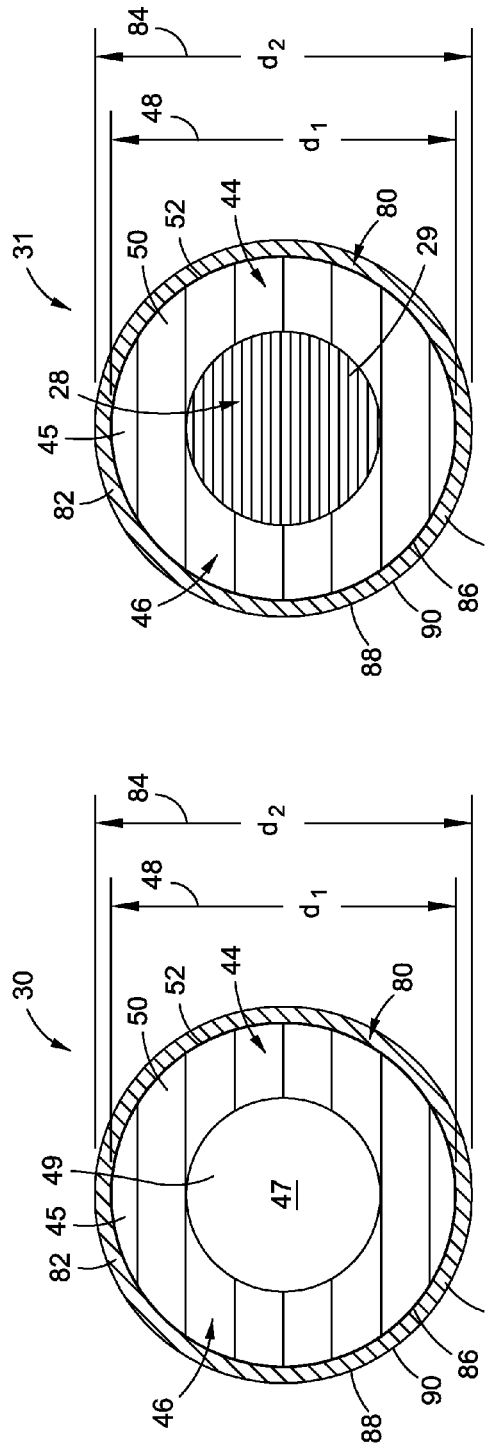

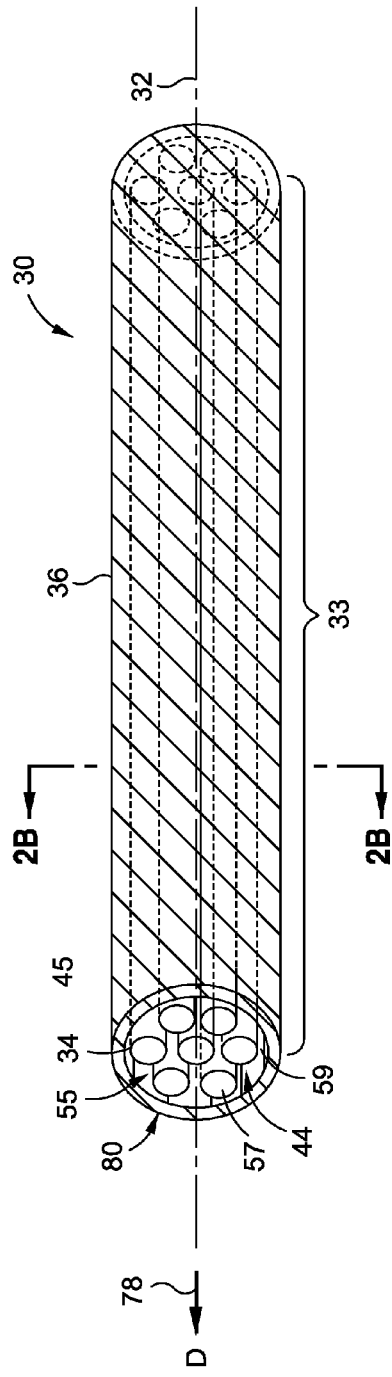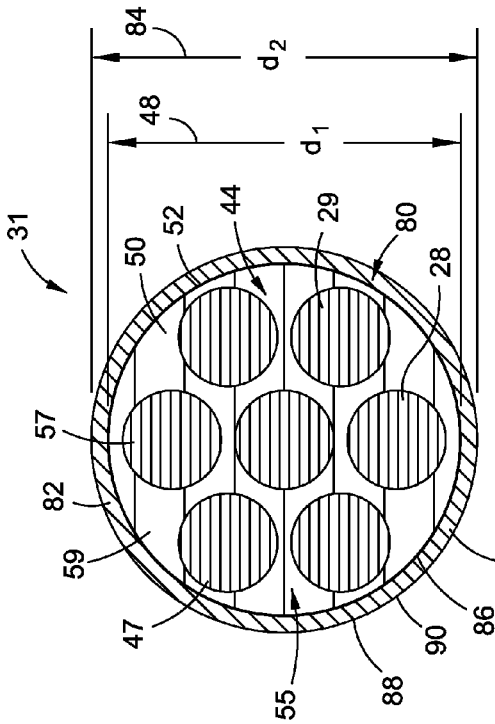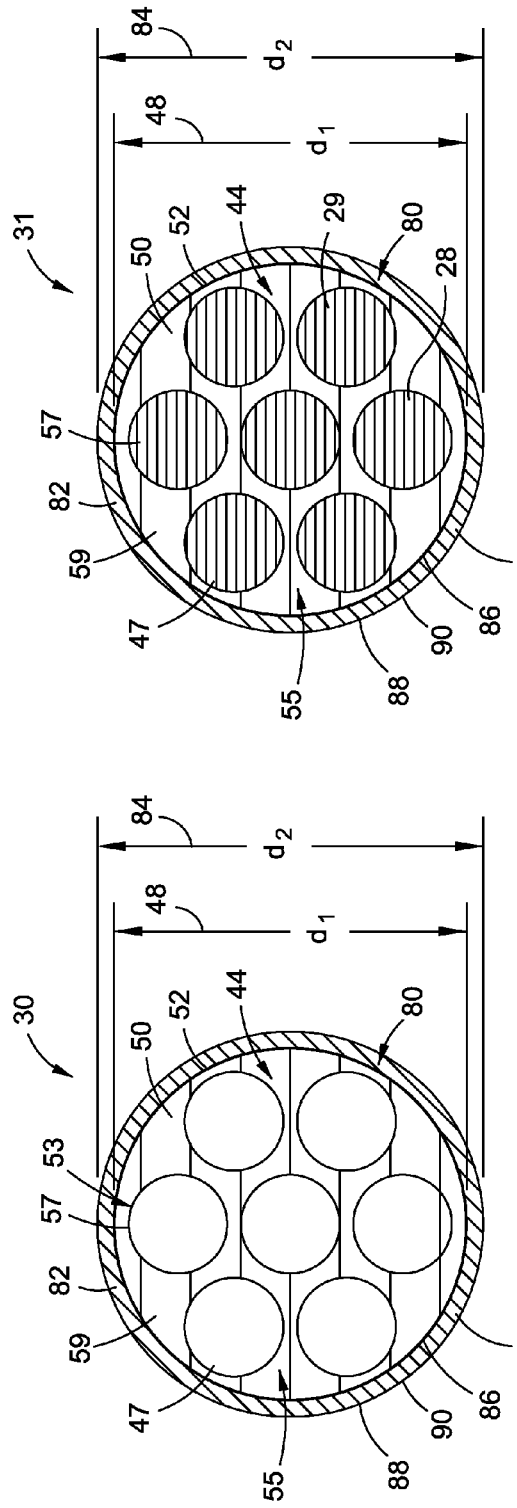

HOLLOW FIBER WITH GRADIENT PROPERTIES AND METHOD OF MAKING THE SAME

BACKGROUND

1) Field of the Disclosure

The disclosure relates generally to hollow fibers with nanostructure reinforcement, and more particularly, to core-shell hollow carbon fibers with core nanostructure reinforcement and gradient properties for use in composite structures for aircraft and other structures.

2) Description of Related Art

Fiber-reinforced resin materials, or "composite" materials as they are commonly known, are used in a wide variety of structures and component parts, including in the manufacture of aircraft, spacecraft, rotorcraft, watercraft, automobiles, trucks, and other vehicles, because of high strength-to-weight ratios, corrosion resistance, and other favorable properties. In particular, in aircraft construction, composite structures and component parts are used in increasing quantities to form the fuselage, wings, tail section, skin panels, and other component parts of the aircraft.

Conventional composite materials typically include glass, carbon, or polyaramid fiber "plies" in woven and/or non-woven configurations. The fiber plies can be manufactured into composite parts by laminating them together with an uncured matrix material (e.g., an epoxy resin). The laminate can then be cured with the application of heat and/or pressure to form the finished part.

The fiber material in composite parts provides relatively high strength in the direction of the fibers. Impact resistance, however, is generally determined by the properties of the cured matrix. Carbon fibers with high moduli and strengths may have issues at the fiber-matrix interface when there is a mismatch between the stiffness of the matrix and the fiber. Known composite materials exist with higher moduli and strengths than currently used high-to-intermediate-modulus fibers. However, such known composite materials have shown a susceptibility to decreased interface properties between the fiber and matrix, thus limiting the benefits available from such higher-performance fibers. In addition, known methods exist that either modify the fiber sizing or use different matrix chemistries. However, such known methods may not overcome the susceptibility to decreased interface properties between the fiber and matrix while still providing improved fiber properties. Moreover, such known methods may increase the weight of the composite materials and may increase costs of manufacturing and production of the composite materials.

Further, another way to increase the impact resistance and fracture toughness of composite parts is to enhance the structural properties of the composite materials by adding nanostructures, such as carbon nanostructures, to the composite materials. Carbon nanotubes are ordered molecules of pure carbon which form very small cylinders (on the order of 10 nanometers (i.e., $1 \times 10^{-8}$ meters)). Carbon nanotubes exhibit unusual strength, and may be over 30 times as strong as typical carbon fibers and 100 times stronger than steel of equivalent weight.

Known composite materials having nanostructure reinforcement, such as carbon nanotube reinforcement, exist. However, such known composite materials may suspend the carbon nanotubes in resin resulting in random orientation of the nanotubes between adjacent fiber plies. Moreover, the addition of even small amounts of carbon nanotubes to a liquid resin tends to dramatically increase its viscosity and, thus, decrease its processability. Further, conventionally produced carbon fibers typically used in aerospace composite materials and other composite materials may have amorphous microstructures in the core of the fiber and ordered, graphitic structures in the outer portion of the fiber, which results in substantial strength and stiffness from such fibers being derived from the outer portion of the fiber.

Moreover, reduction in the overall weight of composite structures and parts may be desirable for aircraft, spacecraft, and other vehicles, as increased weight results in increased use of fuel, and in turn, increased costs. Thus, composite fiber material that enables the manufacture of lower weight structures and parts is advantageous and desirable.

Accordingly, there is a need in the art for an improved fiber with more-tailorable properties for use in composite materials and a method of making the same that provide advantages over known materials and methods.

SUMMARY

This need for an improved fiber with more-tailorable properties for use in composite materials and a method of making the same is satisfied. As discussed in the below detailed description, embodiments of the improved fiber with more-tailorable properties and a method of making the same may provide significant advantages over known materials and methods.

In an embodiment of the disclosure, there is provided a hollow fiber. The hollow fiber comprises an inner-volume portion. The inner-volume portion comprises a first-core portion having a plurality of nanostructures and one or more first polymers. The nanostructures act as an orientation template for orientation of the one or more first polymers in a direction parallel to a longitudinal axis of the hollow fiber. The inner-volume portion further comprises one or more hollow second-core portions, the first-core portion being in contact with and encompassing the one or more hollow second-core portions. The hollow fiber further comprises an outer-volume portion having one or more second polymers, the outer-volume portion being in contact with and completely encompassing the inner-volume portion. The inner-volume portion has at least one of a tensile modulus and a strength that are higher than at least one of a tensile modulus and a strength of the outer-volume portion.

In another embodiment of the disclosure, there is provided a hollow fiber. The hollow fiber comprises an inner core portion. The inner core portion comprises a first-core portion having a plurality of carbon nanotubes and a plurality of first polymers. The carbon nanotubes act as an orientation template for orientation of the plurality of first polymers in a direction parallel to a longitudinal axis of the hollow fiber. The inner core portion further comprises a single hollow second-core portion configuration extending through a length of the hollow fiber, the first-core portion being in contact with and encompassing the hollow second-core portion. The hollow fiber further comprises an outer shell portion having one or more second polymers, the outer shell portion being in contact with and completely encompassing the inner core portion. The inner core portion has at least one of a tensile modulus and a strength that are higher than at least one of a tensile modulus and a strength of the outer shell portion.

In another embodiment of the disclosure, there is provided a hollow fiber. The hollow fiber comprises an inner core portion. The inner core portion comprises a first-core portion having a plurality of carbon nanotubes and a plurality of first polymers. The carbon nanotubes act as an orientation template for orientation of the plurality of first polymers in a direction parallel to a longitudinal axis of the hollow fiber. The inner core portion further comprises a plurality of hollow second-core portions configuration extending through a length of the hollow fiber to form an islands-in-a-sea configuration, the first-core portion being in contact with and encompassing the hollow second-core portions. The hollow fiber further comprises an outer shell portion having one or more second polymers, the outer shell portion being in contact with and completely encompassing the inner core portion. The inner core portion has at least one of a tensile modulus and a strength that are higher than at least one of a tensile modulus and a strength of the outer shell portion.

In another embodiment of the disclosure, there is provided a composite part. The composite part comprises a plurality of hollow carbon-based fibers. At least one hollow carbon-based fiber comprises an inner-volume portion. The inner-volume portion comprises a first-core portion having a plurality of nanostructures and one or more first polymers. The nanostructures act as an orientation template for orientation of the one or more first polymers in a direction parallel to a longitudinal axis of the fiber. The inner-volume portion further comprises one or more hollow second-core portions, the first-core portion being in contact with and encompassing the one or more hollow second-core portions. The at least one hollow carbon-based fiber further comprises an outer-volume portion having one or more second polymers, the outer-volume portion being in contact with and completely encompassing the inner-volume portion. The inner-volume portion has at least one of a tensile modulus and a strength that are higher than at least one of a tensile modulus and a strength of the outer-volume portion. The composite part further comprises a resin matrix cured to the plurality of hollow carbon-based fibers.

In another embodiment of the disclosure there is provided a method of making a hollow fiber having improved resistance to microfracture formation at a fiber-matrix interface. The method comprises mixing in a first solvent a plurality of nanostructures, one or more first polymers, and a fugitive polymer which is dissociable from the nanostructures and the one or more first polymers, in order to form an inner-volume portion mixture. The method further comprises mixing in a second solvent one or more second polymers in order to form an outer-volume portion mixture. The method further comprises spinning the inner-volume portion mixture and the outer-volume portion mixture and extracting the fugitive polymer from the inner-volume portion mixture in order to form a precursor fiber. The method further comprises heating the precursor fiber to oxidize the precursor fiber and to change a molecular-bond structure of the precursor fiber. The method further comprises obtaining a hollow fiber. The hollow fiber comprises an inner-volume portion having a first-core portion with the nanostructures and with the one or more first polymers being oriented in a direction parallel to a longitudinal axis of the hollow fiber. The inner-volume portion further has one or more hollow second-core portions, the first-core portion being in contact with and encompassing the one or more hollow second-core portions. The hollow fiber further comprises an outer-volume portion having the one or more second polymers, the outer-volume portion being in contact with and completely encompassing the inner-volume portion. The inner-volume portion has at least one of a tensile modulus and a strength that are higher than at least one of a tensile modulus and a strength of the outer-volume portion, resulting in the hollow fiber having an improved resistance to microstructure formation at a fiber-matrix interface.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 1A is an illustration of a perspective schematic view of one of the embodiments of a hollow fiber of the disclosure;

FIG. 1B is an illustration of a cross-section taken along lines 1B-1B of the hollow fiber of FIG. 1A;

FIG. 1C is an illustration of a cross-section of a precursor fiber with a fugitive polymer core portion prior to conversion to the hollow fiber of FIG. 1A;

FIG. 2A is an illustration of a perspective schematic view of another one of the embodiments of a hollow fiber of the disclosure;

FIG. 2B is an illustration of a cross-section taken along lines 2B-2B of the hollow fiber of FIG. 2A;

FIG. 2C is an illustration of a cross-section of a precursor fiber with a fugitive polymer core portion prior to conversion to the hollow fiber of FIG. 2A;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Now referring to the Figures, in an embodiment of the disclosure, as shown in FIGS. 1A-1C, there is provided a hollow fiber 30. FIG. 1A is an illustration of a perspective schematic view of one of the embodiments of the hollow fiber 30 of the disclosure. FIG. 1B is an illustration of a cross-section taken along lines 1B-1B of the hollow fiber 30 of FIG. 1A. FIG. 1C is an illustration of a cross-section of a precursor fiber 31 with a fugitive polymer core portion 28 prior to conversion to the hollow fiber 30 of FIG. 1A.

FIG. 2A is an illustration of a perspective schematic view of another one of the embodiments of a hollow fiber 30 of the disclosure. FIG. 2B is an illustration of a cross-section taken along lines 2B-2B of the hollow fiber 30 of FIG. 2A. FIG. 2C is an illustration of a cross-section of a precursor fiber 31 with a fugitive polymer core portion 28 prior to conversion to the hollow fiber 30 of FIG. 2A.

Figure 3:
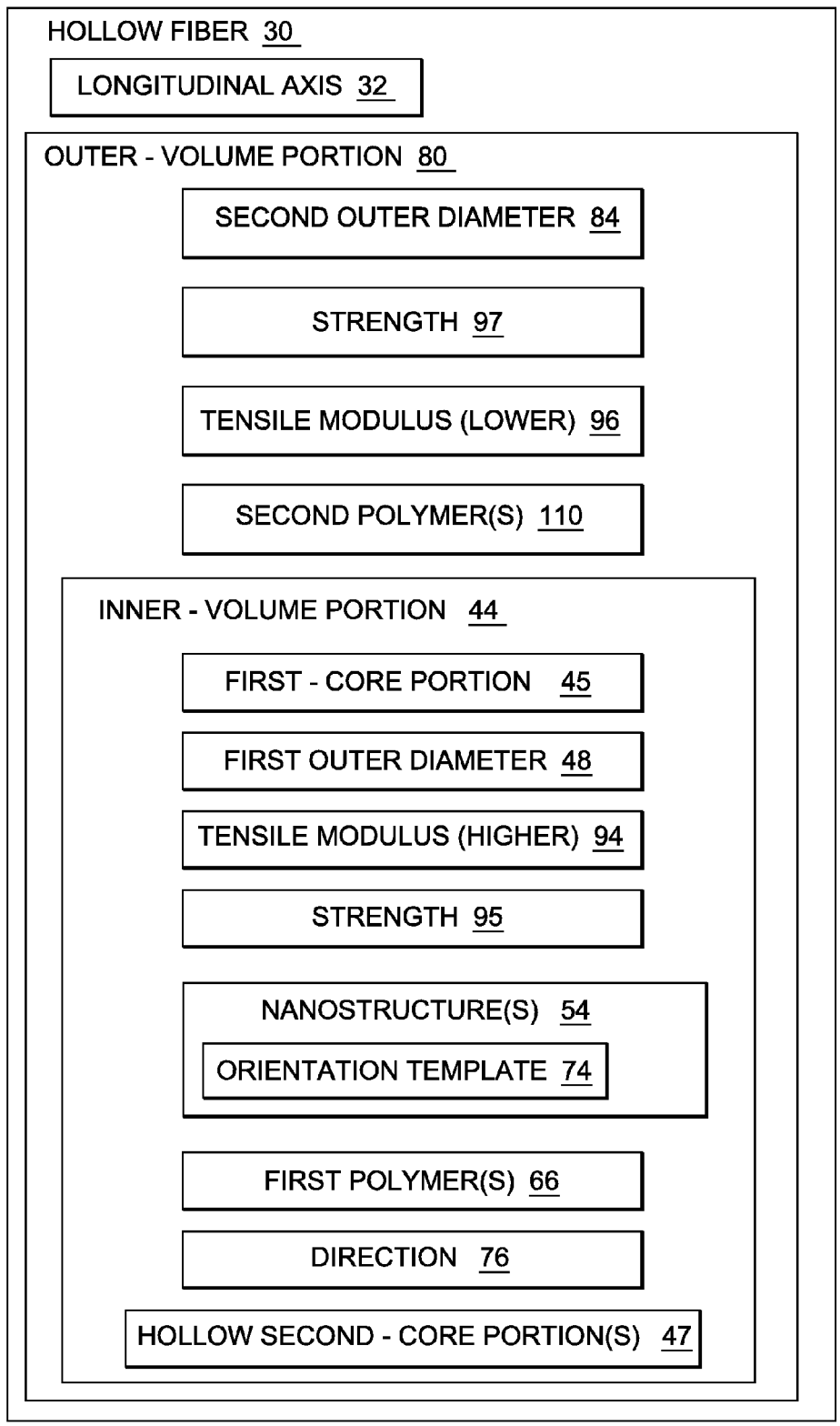
FIG. 3 is an illustration of a block diagram of one of the embodiments of a hollow fiber of the disclosure.
Figure 4:
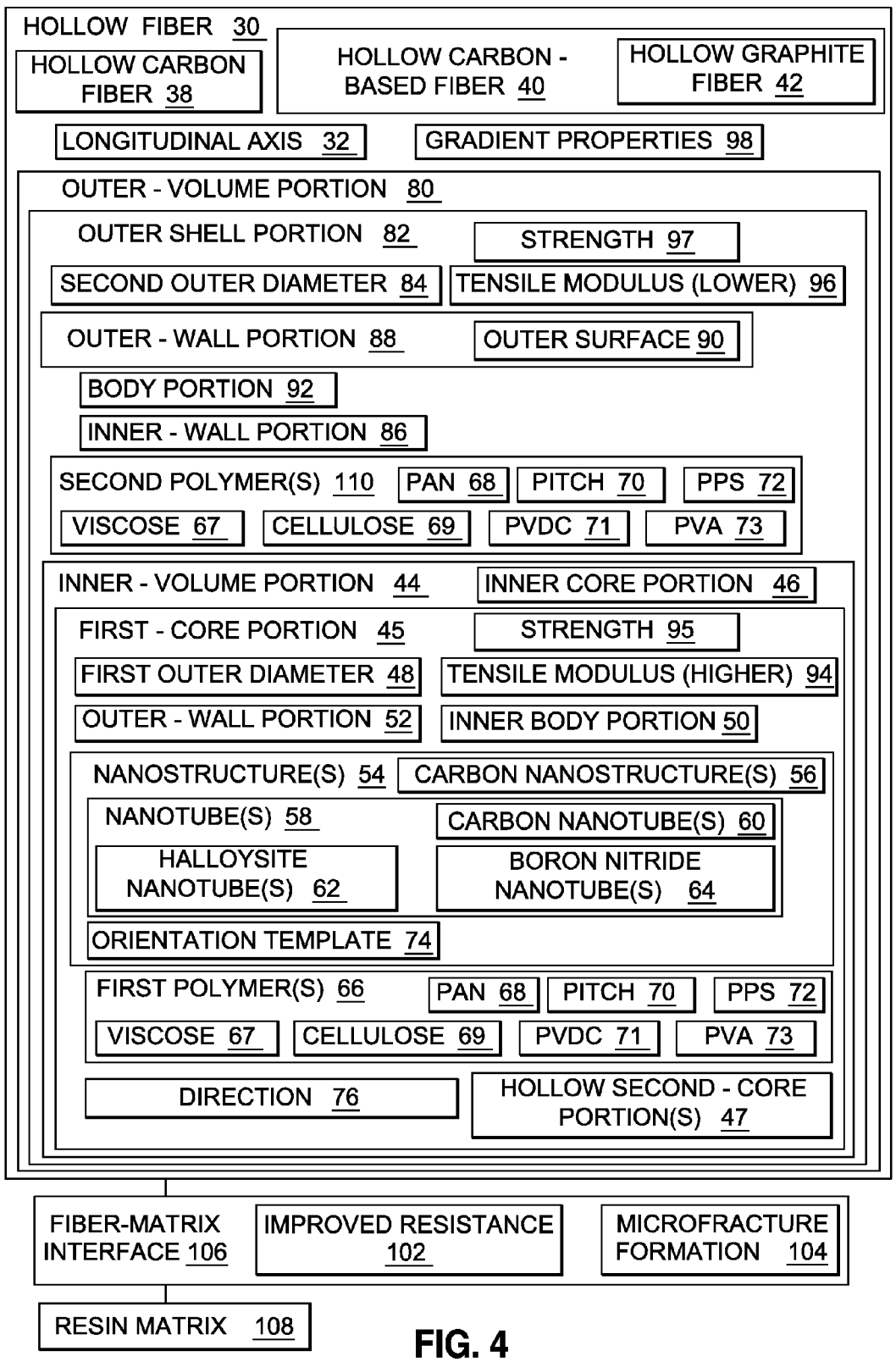
FIG. 4 is an illustration of a block diagram of another one of the embodiments of a hollow fiber of the disclosure.

FIG. 3 is an illustration of a block diagram of one of the embodiments of the hollow fiber 30 of the disclosure. FIG. 4 is an illustration of a block diagram of another one of the embodiments of a hollow fiber 30 of the disclosure.

The term "fiber" as used herein means both fibers of finite length, such as known staple fibers, as well as substantially continuous structures, such as filaments, unless otherwise indicated. As shown in FIG. 1A, the hollow fiber 30 has a longitudinal axis 32 that runs a length 33 of the hollow fiber 30. The hollow fiber 30 is preferably continuous and preferably has a hollow portion structure 34 (see FIG. 1A) rather than being solid. As shown in FIG. 1A, the hollow fiber 30 preferably has a cylindrical or tubular configuration 36 or another suitable configuration. The hollow fiber 30 preferably comprises a hollow carbon fiber 38 (see FIG. 4), a hollow carbon-based fiber 40 (see FIG. 4) such as a hollow graphite fiber 42 (see FIG. 4), or another suitable hollow fiber.

As shown in FIGS. 1B and 2B, the hollow fiber 30 comprises an inner-volume portion 44, preferably in the form of an inner core portion 46 (see also FIG. 4). The inner-volume portion 44 comprises a first outer diameter ($d_1$) 48. The first outer diameter ($d_1$) 48 may preferably range in length from about 2 micrometers to about 50 micrometers; may more preferably range from about 4 micrometers to about 10 micrometers; or may most preferably range about 4 micrometers to about 7 micrometers, or may have another suitable length. As shown in FIG. 1B, the inner-volume portion 44 further comprises an inner body portion 50 and an outer-wall portion 52 surrounding the inner body portion 50.

As shown in FIGS. 1B and 2B, the inner-volume portion 44 further comprises a first-core portion 45 (see also FIGS. 3-4). The first-core portion 45 comprises one or more nanostructure(s) 54 or a plurality of nanostructures 54 (see FIGS. 3-4). As shown in FIG. 4, the nanostructure(s) 54 may preferably comprise carbon nanostructure(s) 56, nanotube(s) 58, carbon nanotube(s) 60, halloysite nanotube(s) 62, boron nitride nanotube(s) 64, or another suitable nanostructure that promotes templating of a precursor polymer. Preferably, the nanostructure(s) 54 are nanotube(s) 58, and more preferably, the nanostructure(s) 54 are carbon nanotube(s) 60. The nanotube(s) 58, such as carbon nanotube(s) 60, that may be used may comprise single-wall, double-wall, or multi-wall structures. Single-wall carbon nanotubes may be made from any known method, such as by gas-phase synthesis from high-temperature, high-pressure carbon monoxide, catalytic vapor deposition using carbon-containing feedstocks and metal catalyst particles, laser ablation, arc method, or any other method for synthesizing single-wall carbon nanotubes. The single-wall carbon nanotubes obtained from synthesis are generally in the form of single-wall-carbon-nanotube powder, which may also be supplied as a dispersion or suspension in a liquid, such as dimethyl acetamide (DMAc), dimethyl formamide (DMF), or another suitable fluid. The inner-volume portion 44 may comprise a percentage of nanostructure content, such as nanotube content, preferably ranging in an amount of from about 0.01% by weight to about 10% by weight; more preferably ranging in an amount of from about 0.01% by weight to about 5% by weight; and most preferably ranging in an amount of from about 0.1% by weight to about 1% by weight. The nanotubes 58 are preferably substantially aligned along the longitudinal axis 32 (see FIG. 1A) of the hollow fiber 30.

As shown in FIGS. 3-4, the first-core portion 45 of the inner-volume portion 44 further comprises one or more first polymer(s) 66. As shown in FIG. 4, the first polymer 66 preferably comprises a polymer such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer.

As used herein, the term "polyacrylonitrile (PAN)" polymer includes polymers comprising at least about 85% by weight acrylonitrile units (generally known in the art as acrylic or polyacrylonitrile polymers). This term as used herein also includes polymers which have less that 85% by weight acrylonitrile units. Such polymers include modacrylic polymers, generally defined as polymers comprising from about 35% by weight to about 85% by weight acrylonitrile units and typically copolymerized with vinyl chloride or vinylidene chloride. Preferably, the polyacrylonitrile polymer has at least 85% by weight polyacrylonitrile units. Other polymers known in the art to be suitable precursors for carbon and graphite fibers, such as polyvinyl alcohol, aromatic polyamides, or poly(acetylenes), may be suitable, if capable of extrusion by melt spinning.

Exemplary melt-processable polyacrylonitriles are described in U.S. Pat. Nos. 5,602,222, 5,618,901 and 5,902,530, the entire disclosure of each of which is hereby incorporated by reference. Such polymers are commercially available, for example, from BP Chemicals Inc., as BAREX acrylic polymers (BAREX is a registered trademark of BP Chemicals Inc. of Cleveland, Ohio), and the like.

Melt-processable/spinnable PANs are particularly preferred because they are excellent precursors for the formation of carbon fibers. In addition, melt-processable PANs exhibit adequate heat resistance, with a melting point of approximately 185° C. (degrees Celsius). Polyacrylonitrile fibers also exhibit good tensile strength and resilience. In addition, polyacrylonitrile fibers are especially advantageous in those embodiments employing dissolution as a means of extraction, because polyacrylonitrile possesses superior water and chemical resistance, thus allowing a wide range of solvents to be employed in the dissolution of the fugitive component.

For purposes of this application, "pitch" is the name for any of a number of highly viscous liquids which appear solid at room temperature and include a mixture of predominantly aromatic and alkyl-substituted aromatic hydrocarbons. Pitch may be made from petroleum products or plants. Petroleum-derived pitch is also called bitumen, while pitch produced from plants is also known as resin. Preferably, the pitch polymer comprises a mesophase pitch. When heated, pitch materials form an isotropic mass. As heating continues, spherical bodies begin to form. The spherical bodies are of an anisotropic liquid-crystalline nature. These spheres continue to grow and coalesce until a dense continuous anisotropic phase forms, which phase has been termed the "mesophase." Thus, the mesophase is the intermediate phase or liquid-crystalline region between the isotropic pitch and the semi-coke obtainable at higher temperatures. Mesophase pitch suitable for certain embodiments disclosed herein may be extracted from natural pitch. For example, mesophase pitch may be solvent-extracted from isotropic pitch containing mesogens as described in U.S. Pat. No. 5,032,250, the contents of which are hereby incorporated by reference. U.S. Pat. Nos. 4,277,324 and 4,208,267 also describe processes for obtaining mesophase pitch by treating isotropic pitch; the contents of each are hereby incorporated by reference. An isotropic pitch comprises molecules which are not aligned in optically ordered crystals and mesogens are mesophase-forming materials or mesophase precursors.

In other alternative embodiments, polyphenylene sulfide may be substituted for the melt-spinnable PAN. Polyphenylene sulfide (PPS) is considered as an important high-temperature polymer because it exhibits a number of desirable properties. For instance, polyphenylene sulfides desirably exhibit resistance to heat, acids and alkalis, to mildew, to bleaches, aging, sunlight, and abrasion. In one alternative embodiment, the continuous carbon nanofiber comprises a long-chain synthetic polysulfide in which at least 85% to about 99% of the sulfide linkages are attached directly to two aromatic rings. In particular embodiments, a polyarylene sulfide resin composition may be substituted for the PAN. For instance, the resin composition may include at least 70 mole % of p-phenylene sulfide units (e.g., 70 mole % to 100 mole % or 80 mole % to 90 mole %). In such compositions, the balance or remaining 30 mole % may include any combination of an alkyl or an alkoxy group having from 1 to 12 carbon atoms, a phenyl group and a nitro group. In various embodiments, the resin compositions may also include metal hydroxides and/or iron oxides. Suitable resin compositions are provided in U.S. Pat. No. 5,021,497, the contents of which are hereby incorporated by reference.

The nanostructure(s) 54, such as the nanotube(s) 58, carbon nanotube(s) 60, or other suitable nanostructures, act as an orientation template 74 (see FIG. 3) for orientation or orienting of the one or more first polymer(s) 66, and in particular, the polymer chains of the first polymer(s) 66, in a direction 76 (see FIG. 3) that is parallel or substantially parallel to a direction (D) 78 (see FIG. 1A) of the longitudinal axis 32 of the hollow fiber 30. Further, the carbon nanotube(s) 60 may act as orientation templates for the one or more first polymer(s) 66 in the direction 76 that is parallel or substantially parallel to the longitudinal axis 32 of the hollow fiber 30. In particular, the addition of the nanostructure(s) 54, such as the nanotube(s) 58, carbon nanotube(s) 60, or other suitable nanostructures, to the inner-volume portion 44, such as in the form of the inner core portion 46, of the hollow fiber 30, acts to orient the PAN molecules to provide higher stiffness and strength than available from known fibers containing PAN alone. Further, the nanostructure(s) 54, such as the nanotube(s) 58, carbon nanotube(s) 60, or other suitable nanostructures, may act as nucleating agents for polymer crystallization. Thus, the templating or orientation effect of the nanostructure(s) 54, such as the nanotube(s) 58, carbon nanotube(s) 60, or other suitable nanostructures, enables an ordered, crystalline microstructure as compared to known fibers that may have an amorphous microstructure in the core portion of the fiber.

As shown in FIGS. 1A-1B and 2A-2B, the first-core portion 45 of the inner-volume portion 44 further comprises one or more hollow second-core portion(s) 47. The first-core portion 45 is preferably in contact with and encompasses, preferably completely encompasses, the one or more hollow second-core portion(s) 47. In one embodiment, as shown in FIGS. 1A-1B, the hollow second-core portion 47 comprises a single hollow second-core portion configuration 49 extending through a length 33 (see FIG. 1A) of the hollow fiber 30. Preferably, the single hollow second-core portion configuration 49 extends through a center portion 51 of the hollow fiber 30.

In another embodiment, as shown in FIGS. 2A-2B, the hollow second-core portion 47 comprises a plurality of hollow second-core portions configuration 53 where each hollow second-core portion 47 extends through a length 33 (see FIG. 2A) of the hollow fiber 30. Preferably, the plurality of hollow second-core portions configuration 53 is in the form of an islands-in-a-sea configuration 55 (see FIG. 2A).

The one or more hollow second-core portion(s) 47 may preferably be formed when a fugitive polymer 29 is extracted or disappears during conversion of the precursor fiber 31 (see FIGS. 1C and 2C) to the hollow fiber 30. As used herein, the term "fugitive polymer" refers to compounds that may be extracted out of a multi-component fiber or precursor fiber after spinning, but at any one of several points of the fiber-making process. In general, multi-component fibers are formed of two or more polymeric materials which have been extruded together to provide continuous contiguous polymer segments which extend down the length of the hollow fiber.

FIG. 1C is an illustration of a cross-section of a precursor fiber 31 with a fugitive polymer core portion 28 prior to conversion to the hollow fiber 30 of FIG. 1A. FIG. 2C is an illustration of a cross-section of a precursor fiber 31 with a fugitive polymer core portion 28 prior to conversion to the hollow fiber 30 of FIG. 2A. In the islands-in-a-sea configuration 55 shown in FIG. 2C, the fugitive polymer 29 comprises a plurality of islands 57, and the first polymer 66 comprises a sea 59. In an alternate embodiment (not shown), the first polymer 66 may comprise a plurality of solid islands and the fugitive polymer 29 comprises a sea. The diameter of the islands 57 of the fugitive polymer 29 may range in length from about 20 nanometers to 1000 nanometers, or 50 nanometers to 950 nanometers, or 100 nanometers to 900 nanometers, or 250 nanometers to 600 nanometers, or may have another suitable length. In various embodiments, the weight ratio of the first polymer 66, such as PAN, to the fugitive polymer 29 may range from about 20/80 to about 80/20. Alternatively, the islands-in-the-sea configuration 55 may also be characterized by the island/sea ratio. The island/sea ratio may also range from 20/80 to 80/20. In one preferred embodiment, the island/sea ratio ranges from 40/60 to 50/50.

The fugitive polymer, for example, may comprise water-soluble polymers, such as but not limited to, polyvinyl alcohol, polyethylene oxide, polyacrylamide, polylactic acid, or water-soluble copolyester resins, copolymers, terpolymers, and mixtures thereof, or organic-solvent-extractable polymers, such as polystyrene or polyester. In certain embodiments, the fugitive polymer may be extracted from the multi-component fiber using a suitable solvent after spinning but before heat treatment to carbonize the polymer, such as the PAN, component. Alternatively, the fugitive component may comprise a polymer which decomposes upon heat treatment, such as that generally associated with the carbonization of PAN polymers. The decomposition products may then be extracted or removed from the multi-component fibers generally through diffusion through the non-fugitive materials.

In general, the first polymer 66 and second polymer 100, such as melt-spinnable PAN, and the fugitive polymer 29 are chosen so as to be mutually incompatible. The various components preferably have the appropriate solubility characteristics, such that the fugitive polymer is soluble in solvent (if removed using a solvent-extraction process), while the insoluble polymer is preferably capable of withstanding the extraction of the fugitive polymer without detriment. In addition, a balance of adhesion/incompatibility between the components of the composite fiber is considered highly beneficial. The components advantageously adhere sufficiently to each other to allow the pre-extracted multicomponent fiber to be subjected to conventional textile processing such as winding, twisting, weaving, knitting or carding without any appreciable separation of the components, if so desired. Conversely, the polymers are preferably sufficiently incompatible so that adhesion between the components is sufficiently weak, so as to provide ready dissolution during the extraction process.

As shown in FIGS. 1A-1B and FIGS. 2A-2B, the hollow fiber 30 further comprises an outer-volume portion 80, preferably in the form of an outer shell portion 82 (see FIG. 4). As shown in FIGS. 1B and 2B, the outer-volume portion 80 comprises a second outer diameter ($d_2$) 84. The second outer diameter ($d_2$) 84 of the outer-volume portion 80 of the hollow fiber 30 may be varied to fit a desired need or to provide desired properties. For example, the second outer diameter ($d_2$) 84 may preferably range in length from about 2 micrometers to about 50 micrometers; may more preferably range from about 5 micrometers to about 10 micrometers; or may most preferably range about 5 micrometers to about 7 micrometers, or may have another suitable length.

As shown in FIGS. 1B and 2B, the outer-volume portion 80 of the hollow fiber 30 may further comprise an inner-wall portion 86, and an outer-wall portion 88 having an outer surface 90. As further shown in FIGS. 1B and 2B, the outer-volume portion 80 may further comprise a body portion 92 formed between the inner-wall portion 86 and the outer-wall portion 88. As shown in FIGS. 1A and 2A, the outer-volume portion 80 is preferably in contact with and completely encompasses the inner-volume portion 44. Preferably, the outer-volume portion 80 cylindrically encompasses the inner-volume portion 44. As shown in FIG. 3, the inner-volume portion 44 preferably has at least one of a tensile modulus 94 and a strength 95 that are higher than at least one of a tensile modulus 96 and a strength 97 of the outer-volume portion 80, and in particular, at the outer surface 90 of the outer-volume portion 80. Preferably, the hollow fiber 30 has gradient properties 98 (see FIG. 4) that vary from the tensile modulus 94 and/or the strength 95, that are preferably higher in the inner-volume portion 44, to the tensile modulus 96 and/or the strength 97, that are preferably lower at the outer-volume portion 80, and in particular, at the outer surface 90 of the outer-volume portion 80. This results in the hollow fiber 30 having, as shown in FIG. 4, an improved resistance 102 to microfracture formation 104 at a fiber-matrix interface 106 between the outer surface 90 of the outer-volume portion 80 of the hollow fiber 30 and a resin matrix 108 cured or coupled to the hollow fiber 30.

As shown in FIGS. 3-4, the outer-volume portion 80 of the hollow fiber 30 further comprises one or more second polymer(s) 110. As shown in FIG. 4, the second polymer 110 preferably comprises a polymer such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer. The first polymer 66 and the second polymer 110 may each comprise the identical or same polymer. Alternatively, the first polymer 66 and the second polymer 110 may each comprise a different polymer from the same, e.g., identical, polymer or polymer family.

Figure 5:
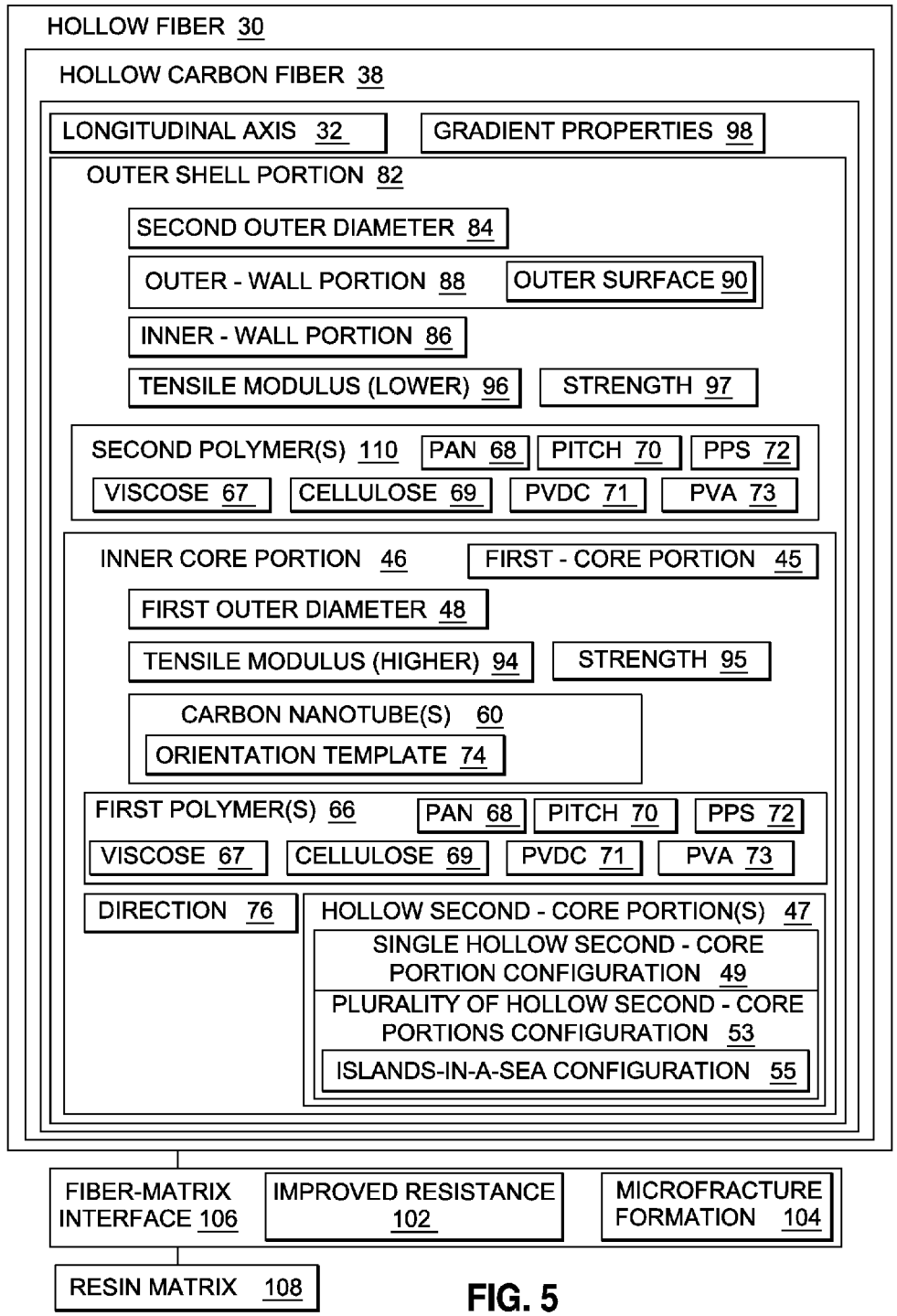
FIG. 5 is an illustration of a block diagram of another one of the embodiments of a hollow fiber of the disclosure.

As shown in FIG. 5, there is provided a hollow fiber 30, preferably in the form of a hollow carbon fiber 38. FIG. 5 is an illustration of a block diagram of another one of the embodiments of the hollow fiber 30 in the form of the hollow carbon fiber 38. As shown in FIG. 5, the hollow fiber 30, such as the hollow carbon fiber 38, comprises an inner core portion 46. The inner core portion 46 comprises a first-core portion 45 having a first outer diameter ($d_1$) 48, a plurality of carbon nanotube(s) 60, and a plurality of first polymer(s) 66. The carbon nanotube(s) 60 act as an orientation template 74 for orientation of the first polymer(s) 66 in a direction 76 parallel or substantially parallel to the longitudinal axis 32 of the hollow fiber 30, such as the hollow carbon fiber 38. Further, the carbon nanotube(s) 60 may act as orientation templates of the first polymer(s) 66 in the direction 76 parallel or substantially parallel to the longitudinal axis 32 of the hollow fiber 30, such as the hollow carbon fiber 38. The inner core portion 46 further comprises one or more hollow second-core portions 47. In one embodiment, the hollow second-core portion 47 may comprise a single hollow second-core portion configuration 49 extending through a length 33 (see FIG. 1A) of the hollow fiber 30. Preferably, the single hollow second-core portion configuration 49 extends through a center portion 51 of the hollow fiber 30. In another embodiment, the hollow second-core portion 47 comprises a plurality of hollow second-core portions configuration 53, where each hollow second-core portion 47 extends through a length 33 (see FIG. 2A) of the hollow fiber 30. Preferably, the plurality of hollow second-core portions configuration 53 is in the form of an islands-in-a-sea configuration 55. The first-core portion 45 is preferably in contact with and encompasses, preferably completely encompasses, the one or more hollow second-core portions 47.

As shown in FIG. 5, the hollow fiber 30, such as the hollow carbon fiber 38, further comprises an outer shell portion 82 having a second outer diameter ($d_2$) 84 (see FIG. 1B) and having one or more second polymer(s) 110. Preferably, the outer shell portion 82 is in contact with and completely, and preferably cylindrically, encompasses the inner core portion 46. As shown in FIG. 5, the inner core portion 46 preferably has at least one of a tensile modulus 94 and a strength 95 that are higher than at least one of a tensile modulus 96 and a strength 97 of the outer shell portion 82, and in particular, at the outer surface 90 of the outer-wall portion 88 of the outer shell portion 82. The first polymer 66 and the second polymer 110 may each comprise the identical or same polymer. Alternatively, the first polymer 66 and the second polymer 110 may each comprise a different polymer from a same polymer family. The first polymer 66 and the second polymer 110 may each comprise a polymer, as discussed above, such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer. As shown in FIG. 5, the hollow fiber 30, such as the hollow carbon fiber 38, preferably has gradient properties 98 that vary from the tensile modulus 94 and/or the strength 95, that are preferably higher in the inner core portion 46, to a tensile modulus 96 and/or the strength 97, that are preferably lower at an outer shell portion 82, and in particular, at an outer surface 90 of the outer-wall portion 88 of the outer shell portion 82. This preferably results in the hollow fiber 30, such as the hollow carbon fiber 38, having an improved resistance 102 to microfracture formation 104 at a fiber-matrix interface 106 between the hollow fiber 30, such as the hollow carbon fiber 38, and a resin matrix 108.

Figure 6:
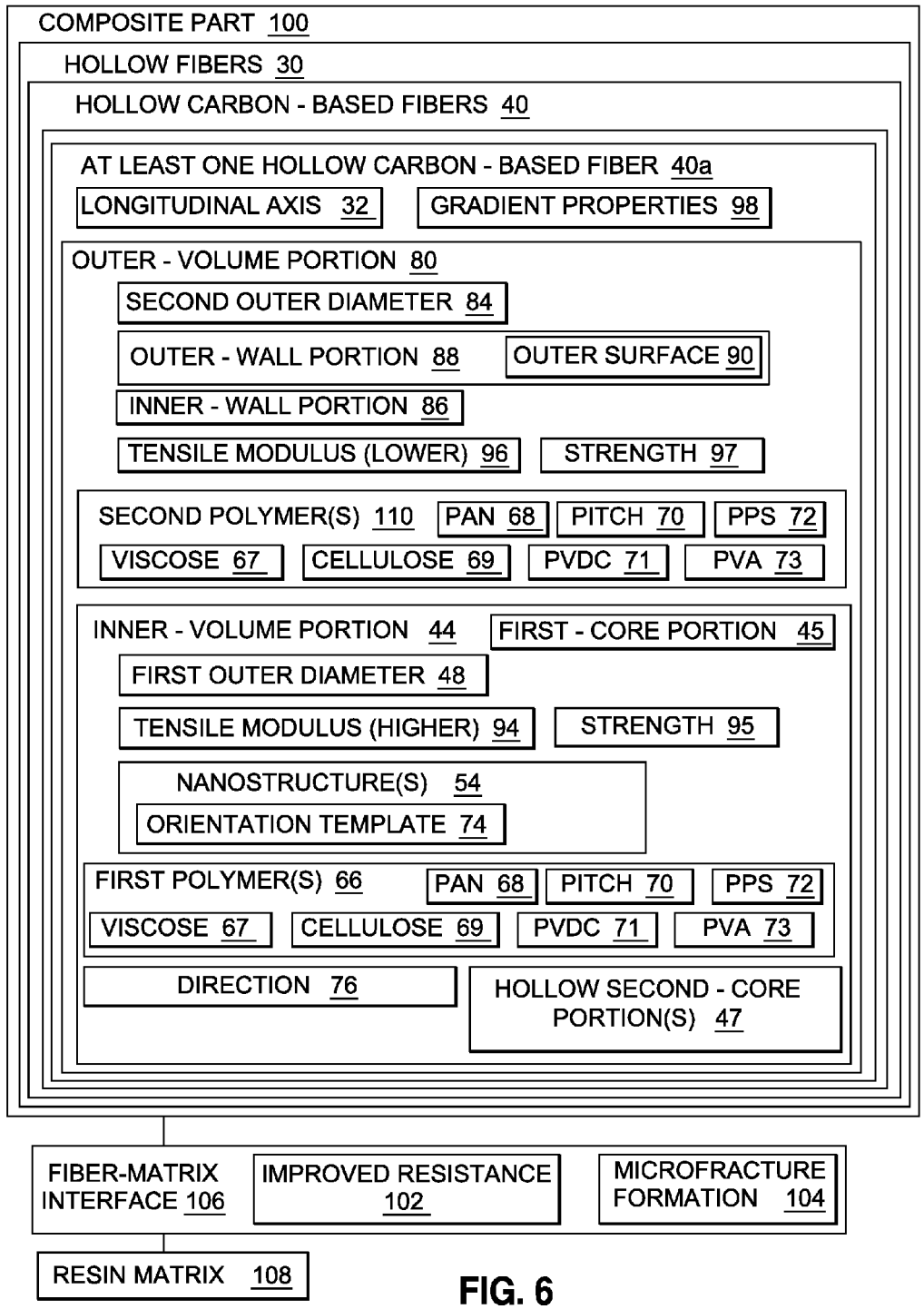
FIG. 6 is an illustration of a block diagram of one of the embodiments of a composite part having one of the embodiments of a hollow fiber of the disclosure.

In another embodiment of the disclosure, as shown in FIG. 6, there is provided a composite part 100. FIG. 6 is an illustration of a block diagram of one of the embodiments of the composite part 100 comprising a plurality of hollow fibers 30, preferably in the form of a plurality of hollow carbon-based fibers 40. At least one of the hollow carbon-based fibers 40a comprises an inner-volume portion 44 having a first outer diameter ($d_1$) 48 (see FIG. 1B) and having a plurality of nanostructure(s) 54 and one or more first polymer(s) 66. The nanostructure(s) 54 act as an orientation template 74 for orientation of the one or more first polymer(s) 66 in a direction 76 parallel or substantially parallel to the longitudinal axis 32 of the at least one hollow carbon-based fiber 40a. Further, the nanostructure(s) 54 may act as orientation templates for the one or more first polymer(s) 66 in the direction 76 parallel or substantially parallel to the longitudinal axis 32 of the at least one hollow carbon-based fiber 40a. As shown in FIG. 6, the at least one hollow carbon-based fiber 40a further comprises an outer-volume portion 80 having a second outer diameter ($d_2$) 84 (see FIG. 1B) and having one or more second polymer(s) 110. The outer-volume portion 80 is preferably in contact with and completely encompasses the inner-volume portion 44. As shown in FIG. 6, the inner-volume portion 44 preferably has at least one of a tensile modulus 94 and a strength 95 that are higher than at least one of a tensile modulus 96 and a strength 97 of the outer-volume portion 80, and in particular, at the outer surface 90 of the outer-wall portion 88 of the outer-volume portion 80.

As shown in FIG. 6, the composite part 100 further comprises a resin matrix 108 cured to the plurality of hollow carbon-based fibers 40 and cured to the at least one hollow carbon-based fiber 40a. The first polymer 66 and the second polymer 110 may each comprise the identical or same polymer. Alternatively, the first polymer 66 and the second polymer 110 may each comprise a different polymer from the same polymer family. The first polymer 66 and the second polymer 110 may each comprise a polymer, as discussed above and shown in FIG. 4, such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer. The nanostructure(s) 54, as shown in FIG. 4, may preferably comprise carbon nanostructure(s) 56, nanotube(s) 58, carbon nanotube(s) 60, halloysite nanotube(s) 62, boron nitride nanotube(s) 64, or another suitable nanostructure that promotes templating of a precursor polymer. The at least one hollow carbon-based fiber 40a preferably has gradient properties 98 that vary from the tensile modulus 94 and/or the strength 95 in the inner-volume portion 44 to the tensile modulus 96 and/or the strength 97 at the outer-volume portion 80, and in particular, at the outer surface 90 of the outer-wall portion 88 of the outer-volume portion 80. This preferably results in the at least one hollow carbon-based fiber 40a having an improved resistance 102 to microfracture formation 104 at a fiber-matrix interface 106 between the at least one hollow carbon-based fiber 40a and a resin matrix 108.

Figure 7:
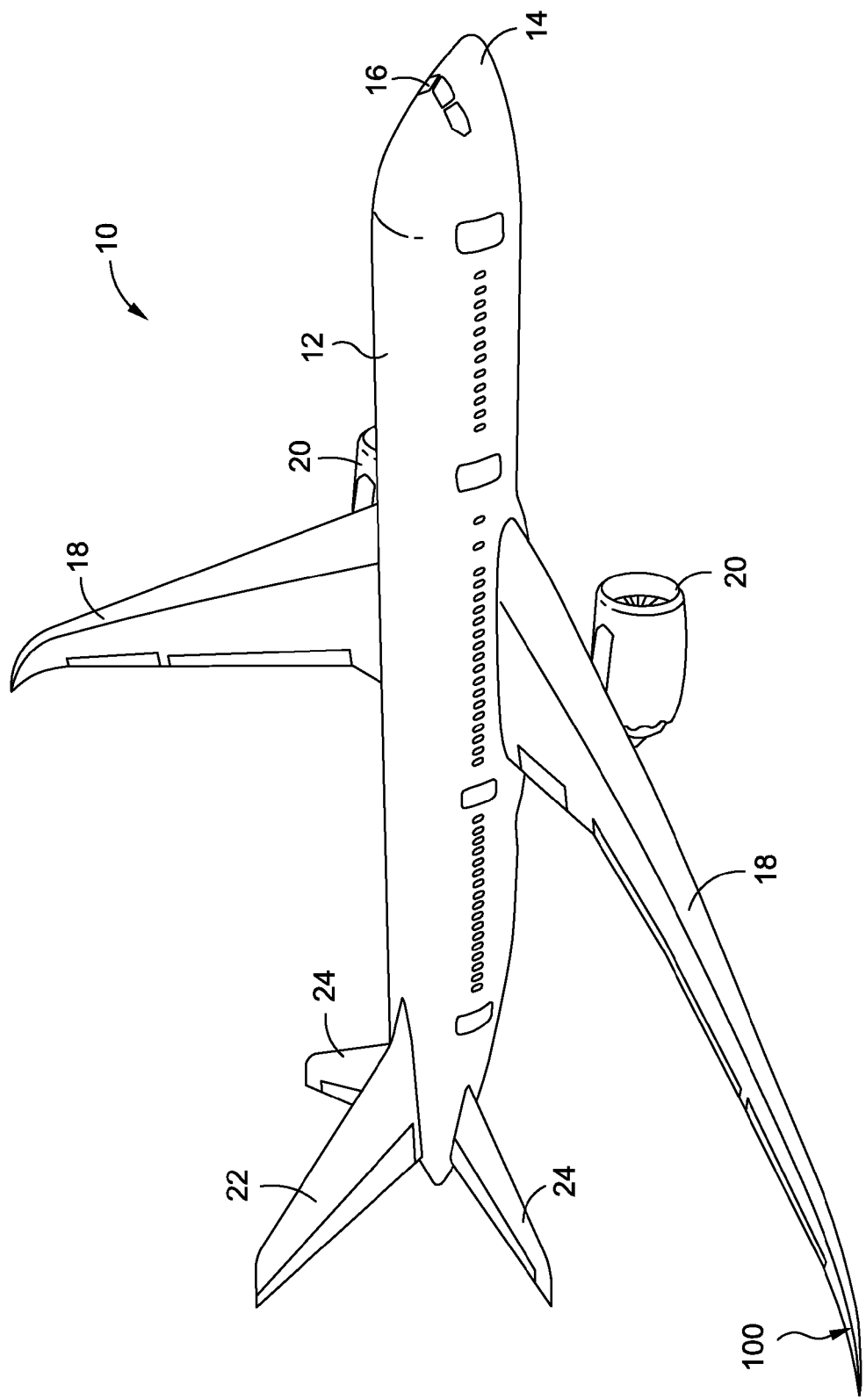
FIG. 7 is an illustration of a perspective view of an exemplary aircraft that may incorporate a composite part having one or more advantageous embodiments of a hollow fiber of the disclosure.

FIG. 7 is an illustration of a perspective view of an exemplary aircraft 10 that may incorporate a composite part 100 (see also FIG. 5) having one or more advantageous embodiments of the hollow fiber 30 (see FIGS. 1A-6) as disclosed herein. As shown in FIG. 7, the aircraft 10 comprises a fuselage or body 12, a nose 14, a cockpit 16, wings 18 operatively coupled to the fuselage or body 12, one or more propulsion units 20, a tail vertical stabilizer 22, and one or more tail horizontal stabilizers 24. Although the aircraft 10 shown in FIG. 7 is generally representative of a commercial passenger aircraft, composite parts, such as composite part 100 for the wing 18 having one or more hollow fibers 30 (see FIGS. 1A-6), may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of the assemblies, methods, and systems in accordance with the disclosure may be utilized in other transport vehicles, such as boats and other watercraft, trains, automobiles, trucks, buses, or other suitable transport vehicles. It may further be appreciated that embodiments of the assemblies, methods, and systems in accordance with the disclosure may be used in various composite structures having one or more of the hollow fibers 30.

Figure 8:
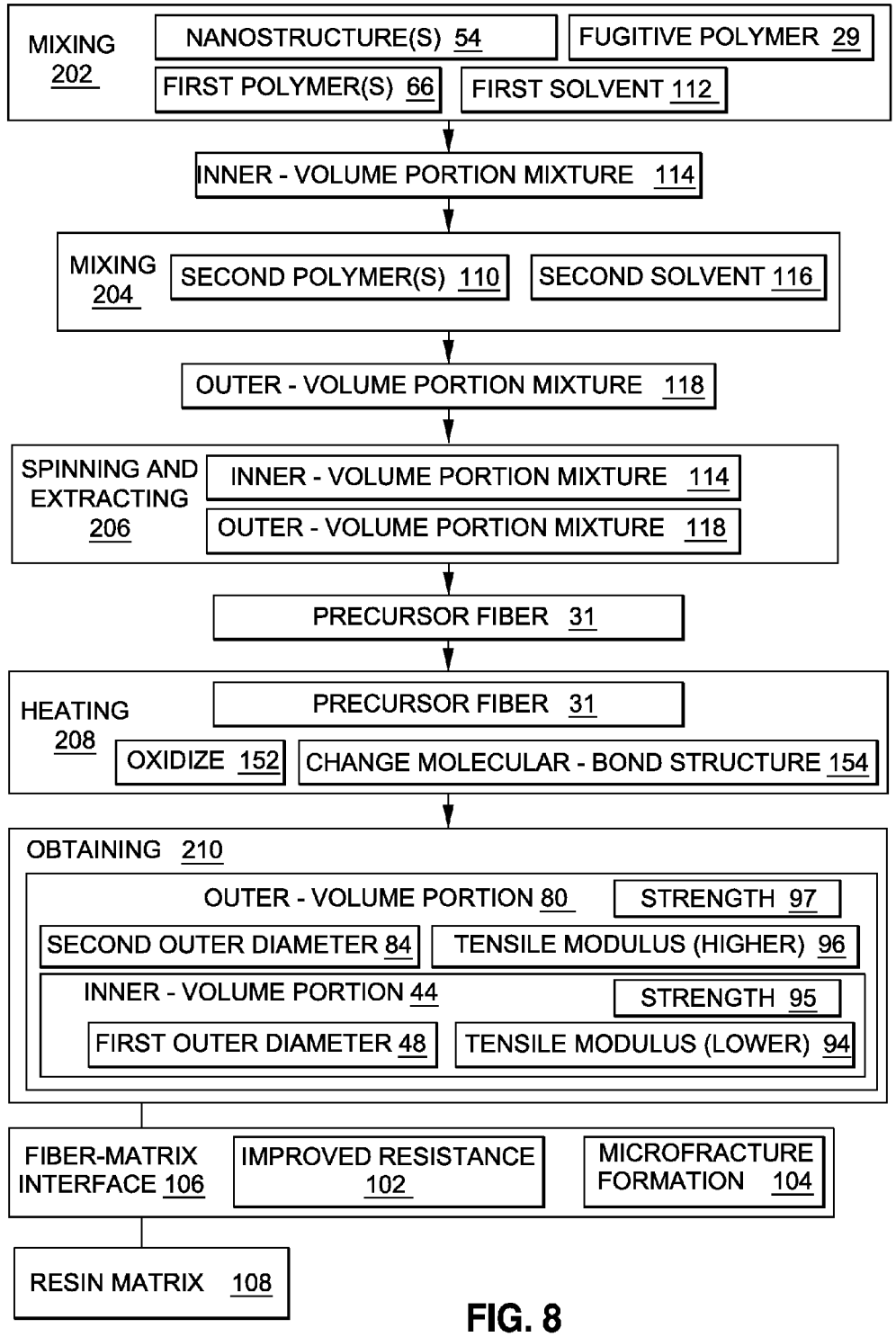
FIG. 8 is an illustration of a schematic diagram of an exemplary embodiment of a method of the disclosure.
Figure 9:
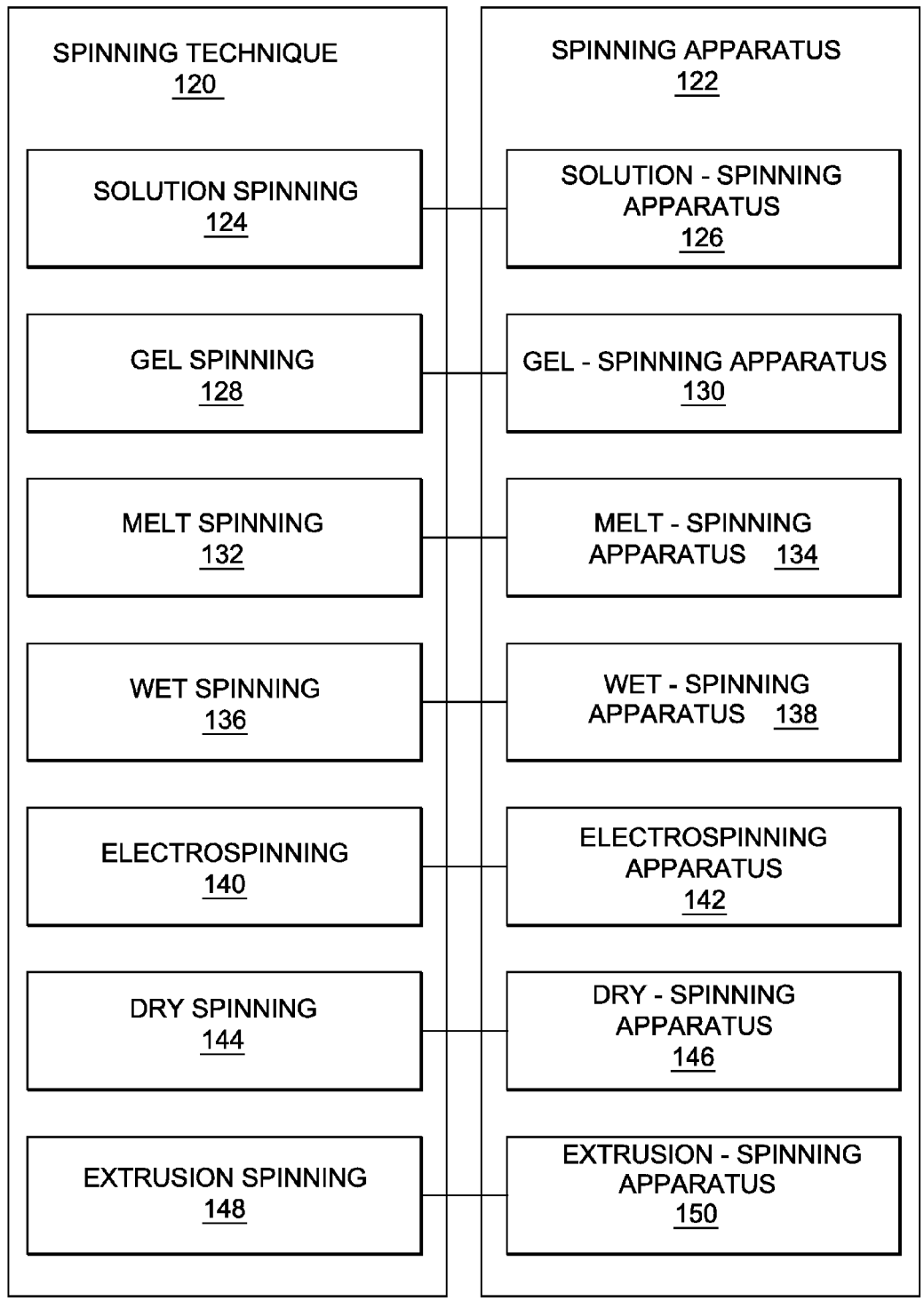
FIG. 9 is an illustration of a block diagram of exemplary embodiments of spinning techniques and spinning apparatuses that may be used in embodiments of the disclosed method of the disclosure; and, FIG. 10 is an illustration of a flow diagram of an exemplary embodiment of a method of the disclosure.
Figure 10:
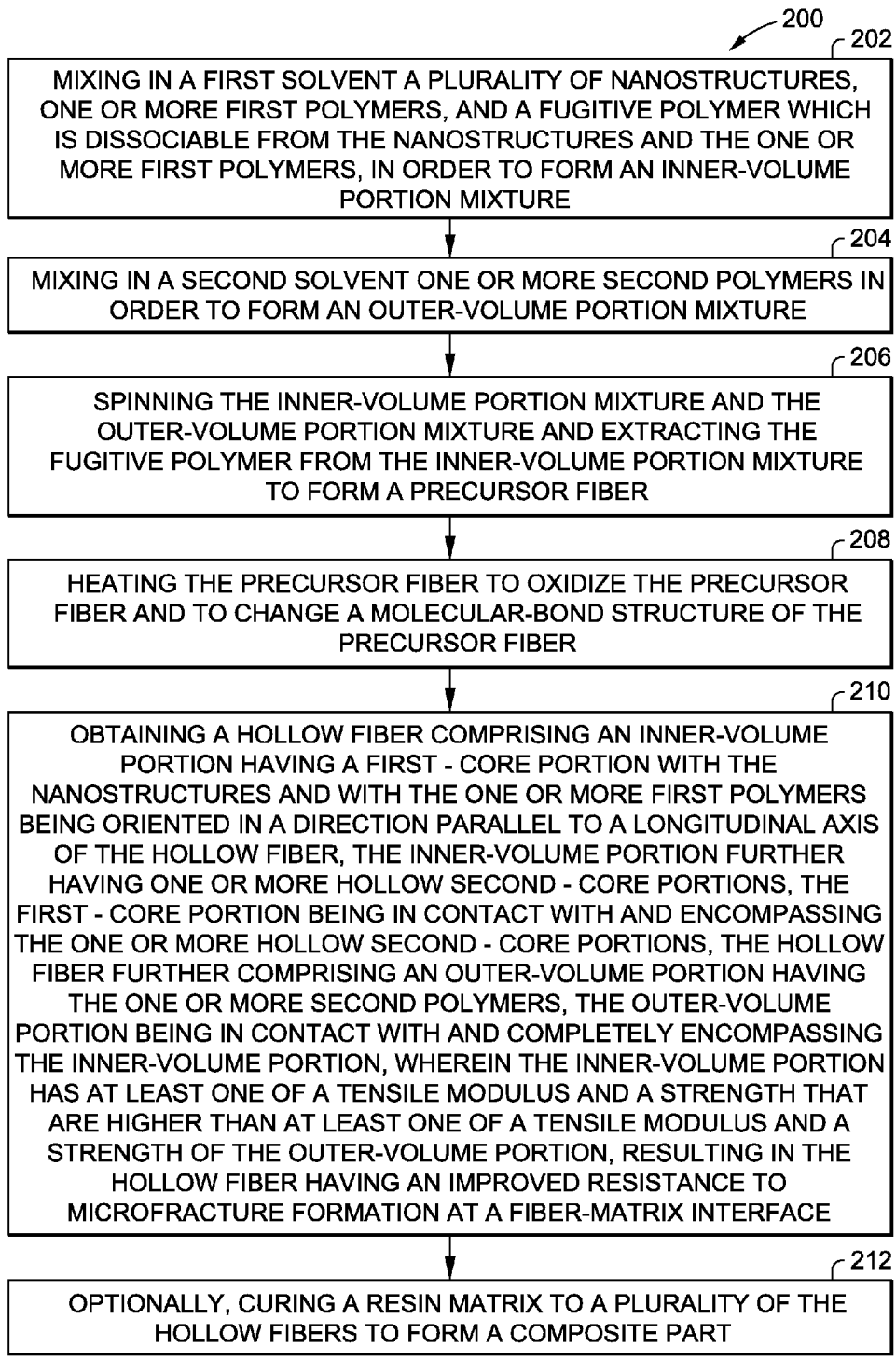

In another embodiment of the disclosure, as shown in FIGS. 8-10, there is provided a method 200 of making a hollow fiber 30 (see FIGS. 1A-6 and 8) having improved resistance 102 (see FIG. 8) to microfracture formation 104 (see FIG. 8) at a fiber-matrix interface 106 (see FIG. 8). FIG. 8 is an illustration of a schematic diagram of an exemplary embodiment of the method 200 of the disclosure. FIG. 9 is an illustration of a block diagram of exemplary embodiments of spinning techniques 120 and spinning apparatuses 122 that may be used in embodiments of the disclosed method 200 of the disclosure. FIG. 10 is an illustration of a flow diagram of an exemplary embodiment of the method 200 of the disclosure.

As shown in FIGS. 8 and 10, the method 200 comprises step 202 of mixing in a first solvent 112 (see FIG. 8) a plurality of nanostructure(s) 54 (see FIG. 8), one or more first polymer(s) 66 (see FIG. 8), and a fugitive polymer 29 which is dissociable from the nanostructure(s) 54 and the one or more first polymer(s) 66, in order to form an inner-volume portion mixture 114 (see FIG. 8). The nanostructure(s) 54 may preferably comprise, as shown in FIG. 4, carbon nanostructure(s) 56, nanotube(s) 58, carbon nanotube(s) 60, halloysite nanotube(s) 62, boron nitride nanotube(s) 64, or another suitable nanostructure that promotes templating of a precursor polymer. The fugitive polymer 29 may comprises a polymer such as polymethylmethacrylate, polyvinyl alcohol, polyethylene oxide, polyacrylamide, polylactic acid, polystyrene, or water-soluble copolyester resins, copolymers, terpolymers, or mixtures thereof, or another suitable polymer. The nanostructure(s) 54, such as carbon nanotube(s) 60, may be in an amount of from about 0.01% to about 10% by weight of the inner-volume portion mixture 114. The nanostructures, such as the carbon nanotubes, may be dispersed within the inner-volume portion mixture 114 by mechanical and/or chemical means (e.g., dispersants or surfactants).

As shown in FIGS. 8 and 10, the method 200 further comprises step 204 of mixing in a second solvent 116 (see FIG. 8) one or more second polymer(s) 110 (see FIG. 8) in order to form an outer-volume portion mixture 118 (see FIG. 8). The first polymer 66 and the second polymer 110 may each comprise the identical or same polymer. Alternatively, the first polymer 66 and the second polymer 110 may each comprise a different polymer from the same polymer family. The first polymer 66 and the second polymer 110 may each comprise a polymer, as discussed above and as shown in FIG. 4, such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer.

The first solvent 112 and the second solvent 116 may each comprise an identical or same solvent. Alternatively, the first solvent 112 and the second solvent 116 may each comprise a different solvent. The first solvent 112 and the second solvent 116 may each comprise a solvent such as dimethylacetamide (DMAc), dimethylformamide (DMF), dimethylsulfoxide (DMSO), dimethyl sulfone ($DMSO_2$), ethylene carbonate, propylene carbonate (PPC), chloroacetonitrile, dimethyl phosphate (DDVP), acetic anhydride ($Ac_2O$), or another suitable solvent.

As shown in FIGS. 8-10, the method 200 further comprises step 206 of spinning the inner-volume portion mixture 114 and the outer-volume portion mixture 118 and extracting the fugitive polymer 29 from the inner-volume portion mixture 114 in order to form a hollow precursor fiber 31. Spinning may comprise a known spinning technique 120 (see FIG. 9) using a known spinning apparatus 122 (see FIG. 9). For example, as shown in FIG. 9, the spinning technique 120 may comprise solution spinning 124 using a solution-spinning apparatus 126, gel spinning 128 using a gel-spinning apparatus 130, melt spinning 132 using a melt-spinning apparatus 134, wet spinning 136 using a wet-spinning apparatus 138, electrospinning 140 using an electrospinning apparatus 142, dry spinning 144 using a dry-spinning apparatus 146, extrusion spinning 148 using an extrusion-spinning apparatus 150, and combinations thereof, or another suitable spinning process.

As shown in FIGS. 8 and 10, the method 200 further comprises step 208 of heating the precursor fiber 31 to oxidize 152 the precursor fiber 31 and to change a molecular-bond structure 154 of the precursor fiber 31. For example, the precursor fibers 31 may be subjected to carbonization comprising the heating of the oxidized precursor fibers 31 to a temperature ranging from about 600 degrees Celsius to about 3000 degrees Celsius.

The inner-volume portion mixture 114 and the outer-volume portion mixture 118 may be extruded and fed into a spin-pack assembly capable of producing fibers comprising nanoscale dimensions and substantially aligning the nanostructures, such as the carbon nanotubes, with the first polymer 66, such as PAN. In various embodiments, the fugitive polymer 29 which is dissociable from the melt-spinnable PAN may be provided to a separate extruder. The inner-volume portion mixture 114 and the outer-volume portion mixture 118 and the fugitive polymer 29 may be separately extruded and fed into a spin-pack assembly capable of producing multi-component fibers comprising nanoscale dimensions in an islands-in-the-sea configuration 55 and substantially aligning the nanostructures, such as the carbon nanotubes, with the first polymer 66, such as the PAN polymer. If an islands-in-the-sea configuration is being produced, various methods include extracting the fugitive polymer 29 from the multi-component fibers to form PAN fibers. Such fibers may be oxidized by sufficiently heating the PAN fibers. Oxidation may involve heating the PAN fibers to around 300 degrees Celsius. The PAN polymer changes from a ladder structure to a stable ring structure as understood by those skilled in the art. To form continuous carbon fibers, which are reinforced by nanostructures, such as carbon nanotubes, being substantially aligned therewith, the oxidized PAN fibers may be subjected to a carbonization. Carbonization may comprise heating of the oxidized fibers to a temperature ranging from about 600 degrees Celsius to about 3000 degrees Celsius.

Extrusion parameters for making multi-component continuous-filament fibers comprising a PAN polymer/carbon nanotube mixture and the fugitive polymer to provide a fiber having nanoscale dimensions according to embodiments described herein may vary depending on the properties desired. In general, however, to form a multi-component fiber, at least two polymers (e.g., PAN/carbon nanotube mixture and the fugitive polymer) are extruded separately and fed into a polymer-distribution system wherein the polymers are introduced into a spinneret plate. The polymers follow separate paths to the fiber spinneret and are combined in a spinneret hole. The spinneret is configured so that the extrudant has the desired overall fiber cross section (e.g., round, trilobal, etc.). Such a process is described, for example, in Hills U.S. Pat. No. 5,162,074, the contents of which are incorporated herein by reference in their entirety.

As shown in FIGS. 8 and 10, the method 200 further comprises step 210 of obtaining a hollow fiber 30 comprising an inner-volume portion 44 with a first outer diameter ($d_1$) 48 (see FIG. 1B) and having a first-core portion 45 with the nanostructure(s) 54 and with the one or more first polymer(s) 66 being oriented in a direction 76 parallel to a longitudinal axis 32 of the hollow fiber 30. The inner-volume portion 44 further has one or more hollow second-core portions 47. The first-core portion 45 is preferably in contact with and encompasses, preferably completely encompasses, the one or more hollow second-core portions 47. The hollow fiber 30 further comprises an outer-volume portion 80 with a second outer diameter ($d_2$) 84 (see FIG. 1B) and having the one or more second polymer(s) 110. The outer-volume portion 80 is preferably in contact with and completely encompasses the inner-volume portion 44. As shown in FIG. 8, the inner-volume portion 44 preferably has at least one of a tensile modulus 94 and a strength 95, i.e., a tensile modulus and/or a strength, that are higher than at least one of a tensile modulus 96 and a strength 97, i.e., a tensile modulus and/or a strength, of the outer-volume portion 80, and in particular, of the outer surface 90 of the outer-wall portion 88 of the outer-volume portion 80. This preferably results in the hollow fiber 30 having an improved resistance 102 to microfracture formation 104 at a fiber-matrix interface 106 between the hollow fiber 30 and a resin matrix 108. The hollow fiber 30 may preferably comprise a hollow carbon fiber 38 (see FIG. 3), a hollow carbon-based fiber 40 (see FIG. 3) such as a hollow graphite fiber 42 (see FIG. 3), or another suitable hollow fiber.

As shown in FIG. 10, the method 200 further optionally comprises step 212 of curing a resin matrix 108 to a plurality of the hollow fibers 30 to form a composite part 100 (see FIGS. 6-7).

In various embodiments of the method 200 disclosed herein, the first polymer 66 and the second polymer 110 typically are selected to have melting temperatures such that the first and second polymer(s) 66, 110, respectively, may be spun at a polymer throughput that enables the spinning of the components through a common capillary at substantially the same temperature without degrading one of the components. Following extrusion through a die, the resulting thin fluid strands, or filaments, may remain in a molten state for some distance before they are solidified by cooling in a surrounding fluid medium, which may be chilled and air blown through the strands. Once solidified, the filaments may be taken up on a godet or other take-up surface. For continuous filaments, the strands may be taken up on a godet that draws down the thin fluid streams in proportion to the speed of the take-up godet.

Continuous-filament fiber may further be processed into staple fiber. In processing staple fibers, large numbers, e.g., 1,000 strands to 100,000 strands, of continuous filament may be gathered together following extrusion to form a tow for use in further processing, as is known in that art. The use of such tows is likewise known in continuous-filament applications, as well. A finish solution may optionally be applied, to aid in fiber processing, as is known in the art. Such finish solution may be chosen so as not to interfere with downstream processes such as extraction and various heat treatments.

According to certain embodiments, a heightened molecular alignment may be achieved while producing the carbon-nanotube-reinforced fibers due to the geometric constraints imposed during spinning. These constraints are preferably greater than those realized when producing larger-diameter fibers. Additionally, the spinneret of the spinning technique and spinning apparatus may be designed to allow for the tailoring of filament diameter and/or wall thickness. As such, a whole range of properties may be achieved.

Polymer-distribution technology allowing the economical production of micro- and nano-sized fibers may use techniques similar to printed-circuit-board technology to manufacture the spin-pack components. These precise components may then be used to accurately distribute polymers in an extremely small area available in the spin pack. Such spin packs allow for the economical and practical production of micro- and nano-sized fibers. Such spin-packs may be provided by Hills, Inc. of West Melbourne, Fla.

Preferably, continuous carbon fibers with nanoscale features structures including carbon nanotubes substantially aligned therein according to disclosed embodiments may be produced by utilizing a spin pack having a distribution system that provides a level of precision to enable the production of nanoscale features within fiber/filament cross sections, especially nanoscale islands-in-a-sea type fibers. Preferably, the geometrical constraints imposed by the precise distribution system of such spin packs substantially align the carbon nanotubes along a longitudinal axis of the fiber. More specifically, the geometric constraints imposed by the choice of spin pack helps cause the PAN and the carbon nanotubes to become substantially aligned within each other along the longitudinal direction of the fiber. For instance, PAN may be substantially oriented along the carbon nanotubes that are aligned in the longitudinal direction of the fiber throughout substantially the entire cross section of a PAN precursor having a honeycomb-like cross section. Likewise, carbon nanotubes may be substantially aligned with substantially the entire cross section of a continuous carbon fiber with nanoscale features having a honeycomb-like cross section in the longitudinal direction of the fiber.

As such, the resulting carbon-nanotube-reinforced PAN hollow fibers disclosed herein may beneficially be graphitized into structural carbon fibers. Such carbon-nanotube-reinforced PAN fibers may include nanotube dimensions to provide improved properties. The PAN precursors may have the fugitive polymer, if present, removed prior to or during oxidation and carbonization to produce a hollow carbon fiber.

According to various alternative embodiments, the melt-spinnable PAN may be replaced with other polymers such as pitch (preferably mesophase pitch) or polyphenylene sulfide (PPS). In one such embodiment, carbon nanotubes may be blended into molten pitch at or slightly above its softening temperature. The blend is then heated to an extrusion temperature which can be about 20 degrees Celsius to about 30 degrees Celsius above the softening temperature and a pitch fiber may be extruded by melt spinning as discussed herein. The pitch-based fiber, having carbon nanotubes, may next be oxidized and then carbonized.

Disclosed embodiments of the hollow fiber 30 and method 200 provide a core-shell hollow fiber wherein both the inner core portion 46 and the outer shell portion 82 are made from the same polymer material, preferably, polyacrylonitrile (PAN) 68 (see FIG. 4). A novel feature is that in the inner core portion 46, the PAN 68 contains nanostructure(s) 54, such as nanotube(s) 58, carbon nanotube(s) 60 (see FIG. 4), or another nanostructure. The nanostructure(s) 54, such as nanotube(s) 58, carbon nanotube(s) 60 (see FIG. 4), or another nanostructure, act as an orientation template 74 (see FIG. 4) to orient molecules of the PAN 68 in order to provide higher stiffness and strength as compared to known fibers having PAN alone.

Further, the templating or orientation effect of the nanostructure(s) 54, such as nanotube(s) 58, carbon nanotube(s) 60 (see FIG. 4) or other nanostructures, enable an ordered, crystalline microstructure, as compared to known fibers that may have an amorphous microstructure in the core portion of the fiber. In addition, disclosed embodiments of the hollow fiber 30 and method 200 provide a core-shell hollow fiber with improved strength and stiffness at a reduced weight with little or no effect on cost. Use of nanostructure(s) 54 in the inner-volume portion 44, such as the inner core portion 46, aligns polymer chains of the one or more first polymer(s) 66 to create a higher stiffness in the inner-volume portion 44 and a lower stiffness at the outer surface 90 of the outer-wall portion 88 of the outer-volume portion 80 of the hollow fiber 30. Thus, any possible mismatch at the fiber-matrix interface 106 between the stiffness of the resin matrix 108 and the stiffness of the hollow fiber 30 is minimized or eliminated. Disclosed embodiments of the hollow fiber 30 and method 200 provide a core-shell nanofiber that is functionally graded and preferably has gradient properties 98 that vary from the tensile modulus 94 and/or the strength 95 in the inner-volume portion 44 to the tensile modulus 96 and/or the strength 97 in the outer-volume portion 80, and in particular, at the outer surface 90 of the outer-wall portion 88 of the outer-volume portion 80 of the hollow fiber 30.

This effect is achieved by combining core-shell spinning with template orientation by the nanostructure(s) 54 in the inner-volume portion 44 of the hollow fiber 30. Thus, the fiber-matrix interface 106 properties of tensile modulus, tensile strength, stiffness, and other properties are improved at the fiber-matrix interface 106. This results in improved resistance of the hollow fiber 30 to microfracture formation 104 at the fiber-matrix interface 106 between the hollow fiber 30 and a resin matrix 108.

Disclosed embodiments of the hollow fiber 30 and method 200 provide a functionally graded hollow carbon fiber 38 in which the outer-volume portion 80 of the hollow fiber 30 has different properties from the inner-volume portion 44 and the inner-volume portion also comprises significant areas that are continuously hollow along the length of the hollow fiber 30. The one or more hollow second-core portions 47 of the inner core portion 45 of the hollow fiber 30 introduces one or more hollow portions to the center of the hollow fiber 30 to reduce weight while maintaining performance. The hollowed portions may be localized islands or extend throughout the length of the fiber.

Disclosed embodiments of the hollow fiber 30 and method 200 provide in one embodiment an outer shell portion 82-first-core portion 45-hollow second-core portion 47 configuration and in another embodiment an outer shell portion 82 islands-in-a-sea configuration 55 core portion. The outer shell portion 82 in both embodiments is preferably unfilled polymer. The first-core portion 45 may comprise one or more polymers identical or different to the polymers comprising the outer shell portion 82 and may further comprise nanostructures, such as carbon nanotubes, that serve to align the polymer along the length of the hollow fiber 30 to increase mechanical properties and to form more highly graphitic structure than the shell or sheath when the hollow fiber is graphitized. The hollow second-core portion 47 is formed from a fugitive polymer 29 that disappears during conversion of the precursor fiber 31 to carbon to leave a hollow center. In the islands-in-a-sea configuration 55, the islands comprise the hollow second-core portion 47 and the sea comprises the first-core portion 45 material such that, during conversion of the precursor fiber 31 to carbon, the islands disappear leaving the hollow second-core portions 47. A core-shell hollow fiber is produced wherein both the inner core portion and outer shell or sheath portion are made from the same basic material—e.g. polyacrylonitrile (PAN). The key difference is that in the inner core portion the PAN contains nanostructures, such as carbon nanotubes. The nanostructures, such as the carbon nanotubes, act to template the PAN molecules to provide a more-graphitic structure with higher stiffness and strength than available from PAN alone. Furthermore, such templating or orientation effect of the nanostructures, such as the carbon nanotubes, enables an ordered, graphitic microstructure.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A continuous-filament hollow finished carbon fiber consisting of:
    an inner-volume portion with a first-core portion having a plurality of carbon nanotubes and a first polymer selected from the group consisting of polyacrylonitrile (PAN), pitch, polyphenylene sulfide (PPS), viscose, cellulose, polyvinylidene chloride (PVDC), and polyvinyl alcohol (PVA), the carbon nanotubes substantially aligned along a longitudinal axis of the continuous-filament hollow finished carbon fiber and polymer chains of the first polymer oriented in a direction parallel to the longitudinal axis of the continuous-filament hollow finished carbon fiber; and, one or more hollow second-core portions, the first-core portion being in contact with and encompassing the one or more hollow second-core portions; and,
    an outer-volume portion having a second polymer selected from the group consisting of polyacrylonitrile (PAN), pitch, polyphenylene sulfide (PPS), viscose, cellulose, polyvinylidene chloride (PVDC), and polyvinyl alcohol (PVA), the outer-volume portion being in contact with and completely encompassing the inner-volume portion,
    wherein the inner-volume portion of the continuous-filament hollow finished carbon fiber has a greater tensile modulus and/or tensile strength than the outer-volume portion of the continuous-filament hollow finished carbon fiber, and further wherein the first polymer of the continuous-filament hollow finished carbon fiber and the second polymer of the continuous-filament hollow finished carbon fiber are the same.

2. The continuous-filament hollow finished carbon fiber of claim 1 wherein the polymer chains of the first polymer that are oriented in the direction parallel to the longitudinal axis of the continuous-filament hollow finished carbon fiber create a higher stiffness in the inner-volume portion and a lower stiffness at the outer surface of the outer-volume portion of the continuous-filament hollow finished carbon fiber.

3. The continuous-filament hollow finished carbon fiber of claim 1 wherein a plurality of continuous-filament hollow finished carbon fibers form a tow.

4. The continuous-filament hollow finished carbon fiber of claim 1 wherein the first polymer and the second polymer of the continuous-filament hollow finished carbon fiber are polyacrylonitrile (PAN).

5. The continuous-filament hollow finished carbon fiber of claim 1 wherein a percentage of carbon nanotube content in the inner-volume portion is in an amount of from about 0.01% by weight to about 10% by weight.

6. The continuous-filament hollow finished carbon fiber of claim 1 wherein the first polymer of the continuous-filament hollow finished carbon fiber and the second polymer of the continuous-filament hollow finished carbon fiber are melt-processable/spinnable polyacrylonitrile (PAN) or a solution spinnable polyacrylonitrile (PAN).

7. The continuous-filament hollow finished carbon fiber of claim 1 wherein the continuous-filament hollow finished carbon fiber has gradient properties that vary from the tensile modulus and the tensile strength that are higher in the inner-volume portion to the tensile modulus and the tensile strength that are lower at the outer-volume portion and that result in the continuous-filament hollow finished carbon fiber having an improved resistance to microfracture formation at a fiber-matrix interface between the continuous-filament hollow finished carbon fiber and a resin matrix, as compared to a continuous-filament hollow finished carbon fiber having an inner-volume portion with a first polymer and an outer-volume portion with a second polymer, each of the first polymer and the second polymer being the same, and the continuous-filament hollow finished carbon fiber not having carbon nanotubes in the inner-volume portion that act as a nucleating agent for orientation of the first polymer in the inner-volume portion.

8. The continuous-filament hollow finished carbon fiber of claim 1 wherein the one or more hollow second-core portions of the continuous-filament hollow finished carbon fiber is a single hollow second-core portion configuration extending through a length of the continuous-filament hollow finished carbon fiber.

9. The continuous-filament hollow finished carbon fiber of claim 1 wherein the one or more hollow second-core portions of the continuous-filament hollow finished carbon fiber are a plurality of hollow second-core portions extending through a length of the continuous-filament hollow finished carbon fiber to form an islands-in-a-sea configuration.

10. The continuous-filament hollow finished carbon fiber of claim 1 wherein the one or more hollow second-core portions of the continuous-filament hollow finished carbon fiber are formed from a fugitive polymer that disappears during conversion of a precursor fiber to the continuous-filament hollow finished carbon fiber.

11. A continuous-filament hollow finished carbon fiber consisting of:

an inner core portion with a first-core portion having a plurality of carbon nanotubes and a first polymer selected from the group consisting of polyacrylonitrile (PAN), pitch, polyphenylene sulfide (PPS), viscose, cellulose, polyvinylidene chloride (PVDC), and polyvinyl alcohol (PVA), the carbon nanotubes substantially aligned along a longitudinal axis of the continuous-filament hollow finished carbon fiber and polymer chains of the first polymer oriented in a direction parallel to the longitudinal axis of the continuous-filament hollow finished carbon fiber; and, a single hollow second-core portion configuration extending through a length of the continuous-filament hollow finished carbon fiber, the first-core portion being in contact with and encompassing the hollow second-core portion; and, an outer shell portion having a second polymer selected from the group consisting of polyacrylonitrile (PAN), pitch, polyphenylene sulfide (PPS), viscose, cellulose, polyvinylidene chloride (PVDC), and polyvinyl alcohol (PVA), the outer shell portion being in contact with and completely encompassing the inner core portion, wherein the inner core portion has at least one of a tensile modulus and a strength that are higher than at least one of a tensile modulus and a strength of the outer shell portion, and wherein the inner core portion of the continuous-filament hollow finished carbon fiber has a greater tensile modulus and/or tensile strength than the outer shell portion of the continuous-filament hollow finished carbon fiber, and further wherein the first polymer and the second polymer are the same.

12. The continuous-filament hollow finished carbon fiber of claim 11 wherein the first polymer of the continuous-filament hollow finished carbon fiber and the second polymer of the continuous-filament hollow finished carbon fiber are polyacrylonitrile (PAN) fiber.

13. A continuous-filament hollow finished carbon fiber consisting of:
an inner core portion with a first-core portion having a plurality of carbon nanotubes and a first polymer selected from the group consisting of polyacrylonitrile (PAN), pitch, polyphenylene sulfide (PPS), viscose, cellulose, polyvinylidene chloride (PVDC), and polyvinyl alcohol (PVA), the carbon nanotubes substantially aligned along a longitudinal axis of the continuous-filament hollow finished carbon fiber and polymer chains of the first polymer oriented in a direction parallel to the longitudinal axis of the continuous-filament hollow finished carbon fiber; and, a plurality of hollow second-core portions configuration extending through a length of the continuous-filament hollow finished carbon fiber to form an islands-in-a-sea configuration, the first-core portion being in contact with and encompassing the hollow second-core portions; and, an outer shell portion having a second polymer selected from the group consisting of polyacrylonitrile (PAN), pitch, polyphenylene sulfide (PPS), viscose, cellulose, polyvinylidene chloride (PVDC), and polyvinyl alcohol (PVA), the outer shell portion being in contact with and completely encompassing the inner core portion, wherein the inner core portion has at least one of a tensile modulus and a strength that are higher than at least one of a tensile modulus and a strength of the outer shell portion, wherein the inner core portion of the continuous-filament hollow finished carbon fiber has a greater tensile modulus and/or tensile strength than the outer shell portion of the continuous-filament hollow finished carbon fiber, and further wherein the first polymer of the continuous-filament hollow finished carbon fiber and the second polymer of the continuous-filament hollow finished carbon fiber are the same.

14. The continuous-filament hollow finished carbon fiber of claim 13 wherein the first polymer of the continuous-filament hollow finished carbon fiber and the second polymer of the continuous-filament hollow finished carbon fiber are polyacrylonitrile (PAN).

15. A composite part comprising:
a plurality of continuous-filament hollow finished carbon fibers, at least one continuous-filament hollow finished carbon fiber consisting of:
an inner-volume portion with a first-core portion having a plurality of carbon nanotubes and a first polymer selected from the group consisting of polyacrylonitrile (PAN), pitch, polyphenylene sulfide (PPS), viscose, cellulose, polyvinylidene chloride (PVDC), and polyvinyl alcohol (PVA), the carbon nanotubes substantially aligned along a longitudinal axis of the continuous-filament hollow finished carbon fiber and polymer chains of the first polymer oriented in a direction parallel to the longitudinal axis of the continuous-filament hollow finished carbon fiber; and, one or more hollow second-core portions, the first-core portion being in contact with and encompassing the one or more hollow second-core portions; and,
an outer-volume portion having a second polymer selected from the group consisting of polyacrylonitrile (PAN), pitch, polyphenylene sulfide (PPS), viscose, cellulose, polyvinylidene chloride (PVDC), and polyvinyl alcohol (PVA), the outer-volume portion being in contact with and completely encompassing the inner-volume portion,
wherein the inner-volume portion has a greater tensile modulus and/or tensile strength than the outer-volume portion, and further wherein the first polymer and the second polymer are the same; and,
a resin matrix cured to the plurality of continuous-filament hollow finished carbon fibers to form the composite part.

16. The composite part of claim 15 wherein the first polymer and the second polymer of the at least one continuous-filament hollow finished carbon fiber are polyacrylonitrile (PAN).

17. The composite part of claim 15 wherein the first polymer of the continuous-filament hollow finished carbon fiber and the second polymer of the continuous-filament hollow finished carbon fiber are melt-processable/spinnable polyacrylonitrile (PAN) or a solution spinnable polyacrylonitrile (PAN).

18. The composite part of claim 15 wherein the one or more hollow second-core portions are a single hollow second core portion configuration extending through a length of the continuous-filament hollow finished carbon fiber.

19. The composite part of claim 15 wherein the one or more hollow second-core portions are a plurality of hollow second-core portions extending through a length of the continuous-filament hollow finished carbon fiber to form an islands-in-a-sea configuration.

* * * * *